US012606306B2

(12) United States Patent
Fislage

(10) Patent No.: US 12,606,306 B2
(45) Date of Patent: Apr. 21, 2026

(54) ARRANGEMENT FOR ACTUATING A CLOSURE ELEMENT, DEVICE FOR DROPPING WATER FROM AN AIRCRAFT FOR FIREFIGHTING PURPOSES, AND AIRCRAFT

(71) Applicant: Airbus Defence and Space GmbH, Taufkirchen (DE)

(72) Inventor: Tobias Fislage, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 18/788,812

(22) Filed: Jul. 30, 2024

(65) Prior Publication Data

US 2025/0058874 A1 Feb. 20, 2025

(30) Foreign Application Priority Data

Aug. 14, 2023 (DE) .......................... 102023121713.5

(51) Int. Cl.
*F16K 31/528* (2006.01)
*B64D 1/16* (2006.01)
*F16K 35/02* (2006.01)

(52) U.S. Cl.
CPC ............ *B64D 1/16* (2013.01); *F16K 31/5282* (2013.01); *F16K 35/027* (2013.01)

(58) Field of Classification Search
CPC .............................. F16K 31/5282; B64D 1/16
See application file for complete search history.

(56) References Cited

U.S. PATENT DOCUMENTS

| | | | | |
|---|---|---|---|---|
| 3,450,161 | A | * 6/1969 | Wright | .................. G01N 30/24 |
| | | | | 137/636.1 |
| 4,195,693 | A | 4/1980 | Busch | |
| 4,219,183 | A | * 8/1980 | Hoffmann | ................. F16K 3/10 |
| | | | | 251/228 |

(Continued)

FOREIGN PATENT DOCUMENTS

| | | |
|---|---|---|
| CA | 2879287 A1 | 9/2008 |
| DE | 2619350 A1 | 11/1977 |

(Continued)

OTHER PUBLICATIONS

Extended European Search Report in EP Application No. 24183695.6, dated Sep. 10, 2024, 5 pages.

(Continued)

*Primary Examiner* — Kevin F Murphy

(74) *Attorney, Agent, or Firm* — KDW Firm PLLC

(57) ABSTRACT

An arrangement for actuating a closure element that is movable to selectively close and open up an outlet opening of a tank, which can be received or is accommodated in an aircraft, of a device for dropping water for firefighting. The arrangement is formed with a Geneva drive mechanism and makes it possible for the closure element situated in an opened position to be closed to close the outlet opening in a closed position, for the closure element to be locked in the closed position, and for the closure element locked in the closed position to be unlocked for opening the closure element, when the tank is full, to release water. A device with the arrangement for dropping water from an aircraft for firefighting purposes and an aircraft with the device are disclosed.

20 Claims, 12 Drawing Sheets

(56) References Cited

U.S. PATENT DOCUMENTS

| | | | | |
|---|---|---|---|---|
| 9,927,044 | B2 * | 3/2018 | Kezar ..................... | F16K 1/221 |
| 10,273,003 | B2 * | 4/2019 | Coulson ................... | B64D 1/16 |
| 11,613,357 | B2 * | 3/2023 | Trotter ..................... | B64D 1/16 |
| | | | | 244/136 |
| 2021/0107650 | A1 | 4/2021 | Bandak | |
| 2021/0229792 | A1 | 7/2021 | Blum | |

FOREIGN PATENT DOCUMENTS

| | | | |
|---|---|---|---|
| DE | 102014226639 | A1 | 6/2016 |
| EP | 2687763 | A1 | 1/2014 |
| FR | 2610894 | A1 | 8/1988 |
| GB | 2332705 | A | 6/1999 |
| RU | 2033828 | C1 | 4/1995 |
| SU | 1631789 | A1 | 6/1992 |
| WO | 2019209150 | A1 | 10/2019 |

OTHER PUBLICATIONS

German Office Action in DE Application No. 10-2023121713.5, dated Mar. 13, 2025, 4 pages.
European Office Action in EP Application No. 24183695.6 dated Oct. 20, 2025, 6 pages.

* cited by examiner

ARRANGEMENT FOR ACTUATING A CLOSURE ELEMENT, DEVICE FOR DROPPING WATER FROM AN AIRCRAFT FOR FIREFIGHTING PURPOSES, AND AIRCRAFT

TECHNICAL FIELD

The disclosure herein relates to an arrangement for actuating a closure element that is movable in order to selectively close and open up an outlet opening of a tank of a device for dropping water from an aircraft for firefighting purposes. The disclosure herein also relates to a device for dropping water from an aircraft, which device has such an arrangement. The disclosure herein furthermore relates to an aircraft, in particular an airplane, having such a device.

BACKGROUND

The disclosure herein and the problem on which it is based will be described below primarily on the basis of the example of a transport aircraft, in particular transport airplane, which is occasionally fitted out for firefighting purposes, without the disclosure herein being restricted to this.

It is generally known that, for fighting in particular vegetation fires such as forest fires, use may for example be made of specially configured extinguishing aircraft that are capable of dropping water during flight. However, the procurement and maintenance of such extinguishing aircraft that are specially constructed for such use involve considerable effort and high costs.

Transport aircraft also exist for a wide variety of civilian and military applications; these aircraft have a large-volume cargo compartment for receiving a wide variety of different articles, are furthermore capable of carrying considerable loads, and are equipped with a tail ramp for example for loading, unloading and dropping purposes.

It can therefore be desirable to be able to also use such transport aircraft for firefighting and/or for firefighting assistance, for example for preventing further fire propagation, and to thus avoid or limit the procurement and maintenance of specialized aircraft that are designed solely for firefighting use.

DE 26 19 350 A1 and U.S. Pat. No. 4,195,693 A describe, on the basis of the Transall C-160 aircraft type, the use of a transport aircraft having a tail loading ramp as a firefighting aircraft. Here, the transport aircraft receives an extinguishing agent equipment set including a tank. It is described that the equipment set is directly driven, or moved on roller tracks, into the fuselage.

It has now been found that it would be desirable if a transport aircraft could be fitted out for occasional use for firefighting purposes not only easily and quickly but also with the fewest possible requirements with regard to the equipment within the aircraft. At the same time, it would be desirable if, during firefighting use, devices for shutting off and enabling the release of water could be actuated as easily and quickly as possible.

SUMMARY

Against this background, it is the object of the disclosure herein to propose an arrangement which makes it possible for a closure element of a tank for the purposes of fighting fires from the air to be actuated in an easy and labor-saving manner, and which can at the same time be used with little effort in an aircraft. It is a further object of the disclosure herein to propose a device for dropping water, which device is easy to actuate and can be used with little effort in an aircraft, and to propose a correspondingly improved aircraft.

The object is achieved according to the disclosure herein by an arrangement and/or by a device and/or by an aircraft disclosed herein.

Accordingly, an arrangement is disclosed for actuating a closure element that is movable in order to selectively close and open up an outlet opening of a tank, which can be received or is accommodated in an aircraft, of a device for dropping water for firefighting purposes. The arrangement is formed in this case with a Geneva drive mechanism. The arrangement makes it possible here for the closure element situated in an opened position to be closed in order to close the outlet opening in a closed position, for the closure element to be locked in the closed position, and for the closure element locked in the closed position to be unlocked for the purposes of opening the closure element, when the tank is full, in order to release water.

Also disclosed according to the disclosure herein is a device for dropping water from an aircraft for firefighting purposes, the device having a tank that has an outlet opening, having a closure element for selectively closing and opening up the outlet opening, and having such an arrangement according to the disclosure herein for actuating the closure element.

The disclosure herein also provides an aircraft, in particular airplane, having such a device.

A realization on which the disclosure herein is based consists in that the effort involved in using the arrangement and the device for dropping water can be considerably reduced if electrical and/or hydraulic and/or pneumatic devices for actuating the closure element are avoided, and provision is made for the closure element to be actuated mechanically, which is in particular easily possible by manual force. With the disclosure herein, therefore, interfaces for the operation of electrical, hydraulic or pneumatic actuators do not need to be provided within the aircraft for the purposes of using the device for dropping water. Instead, with the aid of the Geneva drive mechanism, it is made possible for the closure element to be actuated mechanically, which is easy for an operating person, involves little working effort, and implements in a predefined sequence the actuation operations that are desired for the intended use.

Here, the dropping of water can be enabled with little effort, the closure element can be closed again after the water has been released, and the closed closure element can be securely locked for the refilling of the tank and for the next take-off and flight to the target area. Reliable and fast closing of the closure element after the release of water not only makes it possible here for the operational readiness of the system to be restored already during the return flight, but is also effective in preventing residual water from undesirably escaping into the cargo compartment.

Aircraft, in particular transport aircraft having a cargo compartment, can thus be fitted out with or converted to include a device for dropping water for firefighting purposes, in particular for temporary use, without the need for the aircraft to undergo significant modification or retrofitting, for example with regard to electrical, hydraulic or pneumatic coupling points and supply devices. With the disclosure herein, the simplicity of the actuation is conducive to the fastest possible dropping of water and subsequent restoration of operational readiness for the next flight. This is conducive to effective firefighting.

Here, a further advantage of the disclosure herein is in particular that the disclosure herein can be used equally easily and reliably in the case of different versions of an aircraft type, which differ in terms of the possibilities for providing, for example, an electrical, pneumatic or hydraulic supply to equipment accommodated in the cargo compartment.

The closing of the closure element by a mechanism is furthermore conducive to advantageously being able to compress a seal, for example a surface seal, in a way that allows reliable sealing. The use of the mechanism is conducive to imparting the compression force.

Although the disclosure herein can advantageously be used for converting transport aircraft for general civilian or military transport applications, in particular temporarily, for firefighting purposes, it is equally conceivable for the disclosure herein to advantageously be used in an aircraft which is specifically designed for firefighting and which has a fixedly installed water tank.

Advantageous refinements and developments of the disclosure herein will emerge from the subclaims and from the description with reference to the figures.

In one refinement, the arrangement makes it possible for the closure element to be locked in the opened position thereof and also for the closure element locked in the opened position to be released for the purposes of closing the closure element. In this way, it is possible to prevent the closure element, after it has been unlocked and the outlet opening has consequently been opened up for the purposes of releasing water, from falling back into and interacting with the flow. It is thus possible to avoid a situation in which a fast release of water is impaired by a closure element falling back. A high mass flow rate is made possible. The locking of the closure element in the opened position preferably takes place automatically during the opening operation.

In one refinement, a movable locking partial mechanism is provided for locking the closure element in the closed position. In this refinement, the arrangement makes it possible for the locking partial mechanism to be fastened when the closure element is closed and locked and for the fastened locking partial mechanism to be unfastened. Undesired unlocking, and an undesired release of water at a point in time other than the intended dropping time, are thus reliably prevented.

In particular, the closing of the closure element, the locking of the closure element in the closed position and the unlocking of the closure element locked in the closed position can be effected by movement of one common actuation element. Here, the actuation element may be designed in particular as a lever that can be pivoted by an operating person. These actuating operations can thus be effected by one common mechanical arrangement, and in particular in the desired sequence. This, and the actuation by one actuation element for these operations, make the work of the operating person, for example the so-called "load-master", considerably easier.

In one refinement, furthermore, the closure element locked in the opened position can be released, for the purposes of closing the closure element, by movement of the common actuation element. This step can therefore also be achieved conveniently without the actuation of further operating elements, whereby the outlet opening can be closed again with little working effort and in a time-saving manner.

In one refinement, furthermore, the fastening and unfastening of the locking partial mechanism can be effected by movement of the common actuation element. The steps of fastening and unfastening can thus also be effected in an effort-saving manner without the additional use of further operating elements, allowing further improved reliability whilst involving little working effort for the operating person.

In particular, the Geneva drive mechanism is configured with a first Geneva drive and a second Geneva drive. This is conducive to operations during the actuation of the closure element being reliably performed in a defined sequence.

In one refinement, a drive geometry of the first Geneva drive and a drive geometry of the second Geneva drive are movable conjointly by the common actuation element. This is conducive to low actuation effort, and makes it possible to ensure the desired defined sequence of actuating operations.

In one refinement, the common actuation element is connected rotationally conjointly to a drive element of the Geneva drive mechanism. Here, provision may be made in particular for the drive element to be configured with the drive geometry of the first Geneva drive and the drive geometry of the second Geneva drive. The Geneva drives are thus driven in a simple, reliable and space-saving manner.

In one refinement, by operation of the first Geneva drive, the closing of the closure element can be effected by virtue of the closure element being moved from its opened position into its closed position. The closure element can thus advantageously be reliably closed at the desired point in time within the defined sequence of operations. The mechanical actuation of the closure element is furthermore conducive to the implementation of a sealing concept that requires the compression of a seal.

In one refinement, by operation of the first Geneva drive, a movable latching assembly can be moved into a latching-ready position, in which the closure element can be locked in the opened position thereof by latching by the latching assembly, and into a release position, in which the locking of the closure element in the opened position is released and the latching of the closure element is not possible. The operations of latching and releasing the locking are thus also reliably incorporated into the defined sequence of actuating operations.

In one refinement, a first control geometry can be moved in rotation by the first Geneva drive at an output side, wherein the closure element can be moved into the closed position by virtue of an engagement element that is coupled to the closure element bearing against a portion of the first control geometry during a rotational movement thereof and the engagement element being driven along a substantially arcuate path. The first control geometry may in particular be designed in the form of a groove or a slot. This in particular achieves a reliable movement of the closure element into the closed position, and at the same time ensures that an opening of the closure element under the water pressure of the filled tank at the desired dropping time is not impeded by the control geometry.

In one environment, the latching assembly can be moved between the latching-ready position and the release position by virtue of an engagement element that is coupled to the latching assembly being guided, as a result of a rotation of the first control geometry, along a path with a variable spacing to an axis of the rotation. By the variation of the spacing to the axis of rotation, in particular by a combination of regions of constant and variable spacing in the first control geometry, it is possible here for the latching geometry to be brought into the latching-ready position at a desired point in time, for example shortly before the closure element is unlocked and the outlet opening is opened up, such that the closure element, when it is opened, preferably latches in the fully opened position and is hereby locked open. It is furthermore made possible, when the first control geometry is moved back, for the latching assembly to be moved into its release position again in order to enable movement of the closure element for closing purposes.

In one refinement, by operation of the second Geneva drive, a locking element can be moved, by which the closure element can be locked in the closed position. The locking can thus also be mechanically integrated in a defined manner into the sequence of actuating operations.

In one refinement, by operation of the second Geneva drive, a fastening hook can be moved, by which the locking element can be temporarily fastened so as to be prevented from moving out of a locking position. A fastener for the locking element can thus be created which allows fastening for preventing undesired unlocking.

In particular, provision may be made whereby the locking element is designed as part of the locking partial mechanism, and whereby the locking partial mechanism passes through a dead center during the movement of the locking element from its locking position into its unlocking position or vice versa. An undesired release of the locking as a result of the load on the closure element, in particular owing to the water pressure in the tank, can thus be even more effectively prevented.

In one refinement, a second control geometry can be moved by the second Geneva drive at an output side, wherein the locking element can be moved into a locking position by virtue of an engagement element, which is movable in a manner coupled to a movement of the locking element, bearing against a first portion of the second control geometry during a rotational movement thereof and the engagement element being driven along a substantially arcuate path in a first direction, and can be moved into an unlocking position by virtue of the engagement element bearing against a second portion of the second control geometry during a rotational movement thereof and the engagement element being driven along the path in a second direction. The second control geometry may in particular be designed in the form of a groove or a slot. In particular, not only are the unlocking and locking thus achieved, but it can also be achieved that the closure element, when it is opened up, is opened quickly and without being impeded by the locking element.

The engagement element that is coupled so as to be movable with the movement of the locking element may in particular be arranged at an articulated connection of the locking partial mechanism. By virtue of the engagement element being driven along by the first and second portions of the second control geometry, it can for example be achieved that the locking partial mechanism passes through a dead center.

In one refinement, the fastening hook can be moved between a fastening position and an unfastening position by virtue of an engagement element that is coupled to the fastening hook being guided, as a result of a rotation of the second control geometry, along a path with a variable spacing to an axis of the rotation. Thus, with regard to the positions assumed by the fastening hook, a defined chronological sequence is possible, which can be adapted in a predefined manner to the change in position of the locking element and for example to the position of the engagement element, which is coupled in terms of movement to the locking element. Here, provision may be made in particular whereby the fastening hook, in the fastening position, is in engagement with the engagement element, which is coupled in terms of movement of the locking element, or with an engagement portion of the locking partial mechanism, which engagement portion is provided in the region of the engagement element.

In one refinement, the locking partial mechanism may be intrinsically movable, and arranged as a whole so as to be static relative to the outlet opening. In particular, in one refinement, a partial mechanism comprising the locking partial mechanism, the fastening hook and the second control geometry may be intrinsically movable, and arranged as a whole so as to be static relative to the outlet opening. This is conducive to simplifying the structure of the arrangement.

In another refinement, the locking partial mechanism may be intrinsically movable, and arranged as a whole so as to be movable conjointly with the closure element relative to the outlet opening. In particular, in one refinement, a partial mechanism comprising the locking partial mechanism, the fastening hook and the second control geometry may be intrinsically movable, and arranged as a whole so as to be movable conjointly with the closure element relative to the outlet opening. In this way, structural space can be saved in the region of the outlet opening, for example below and/or in a lower region of the outlet opening, and the accommodation of the arrangement can be further facilitated.

In one refinement, the arrangement may have a preload device, by which the closure element, as it is closed for the purposes of closing the outlet opening, can be preloaded in an opening direction. In particular, the preload device may have a spring element. The action of the water pressure on the closure element when the tank is full can thus be assisted by the preload device. It can thus be achieved that, after the closure element has been unlocked, the closure element quickly and reliably opens, and opens up the outlet opening, in order to release water.

In one refinement of the disclosure herein, the device for dropping water is designed to be mobile, wherein the tank is provided for being received and fixed in a cargo compartment of the aircraft. The device for dropping water can thus be designed as a "roll-on-roll-off firefighter kit"; in other words, the device can be quickly and easily placed into the cargo compartment and then used temporarily for firefighting purposes. The device can just as easily be removed from the cargo compartment again when it is no longer needed for firefighting.

In particular, the device for dropping water may have an outlet line through which water that is contained in the tank can flow out of the tank for the purposes of dropping the water, wherein the outlet line is designed to extend from the tank to a free end of a tail ramp of the aircraft.

Note that, in particular, the above-described refinements and developments may each be applied to the arrangement for actuating the closure element, to the device for dropping water, and to the aircraft.

BRIEF DESCRIPTION OF THE DRAWINGS

The disclosure herein will be discussed in more detail below with reference to the figures of the drawings.

Figure 1:
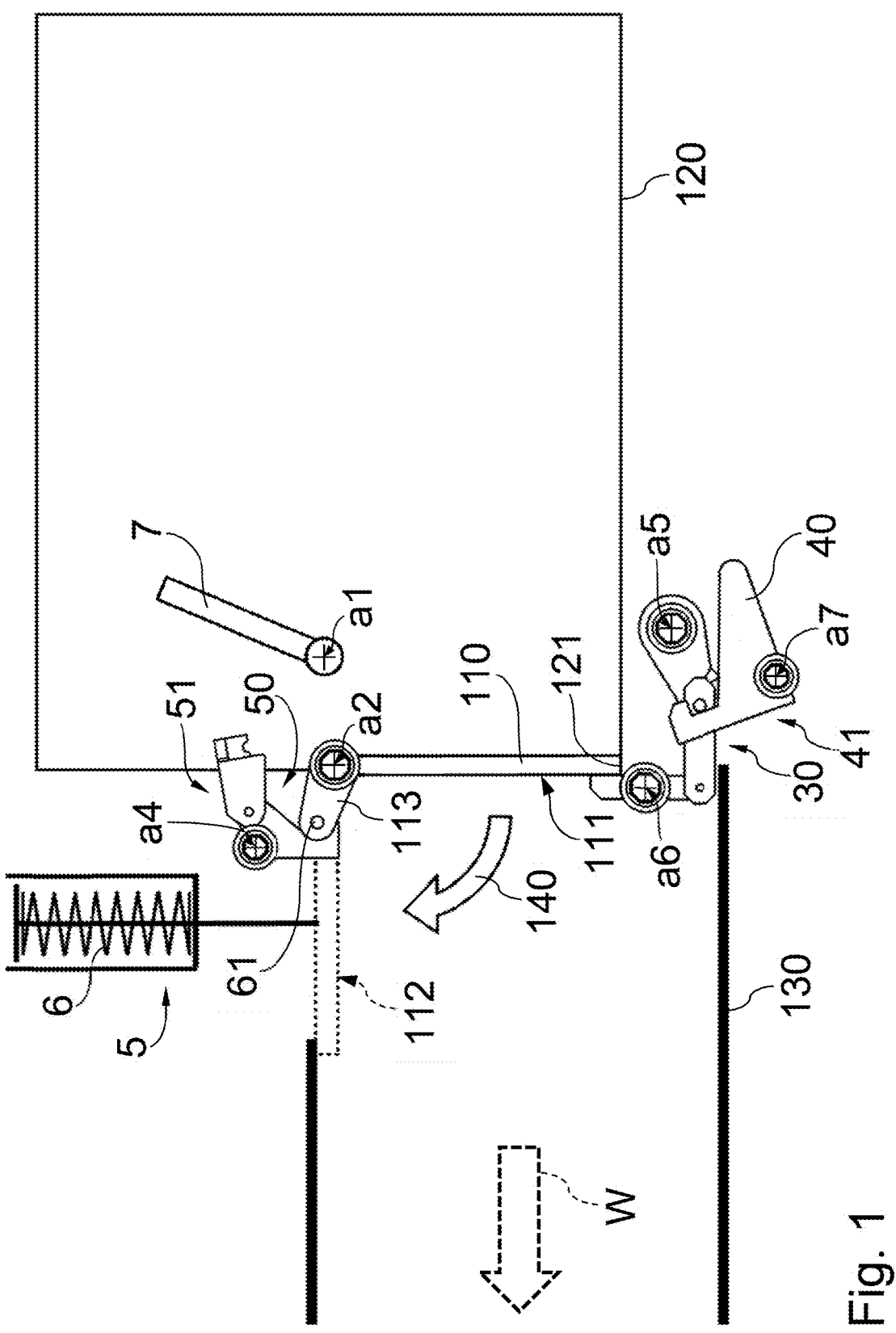
FIG. 1 shows a device for dropping water from an aircraft for firefighting purposes according to a first example embodiment of the disclosure herein, in a schematic side view and in a state in which an outlet opening of a tank is closed, with certain components of an arrangement for actuating a closure element for the outlet opening having been omitted in order to give a better overview.

In the figures, the same reference designations are used to denote identical or functionally identical components unless stated otherwise. The elements in the drawings are not necessarily shown true to scale relative to one another.

DETAILED DESCRIPTION

Figure 11:
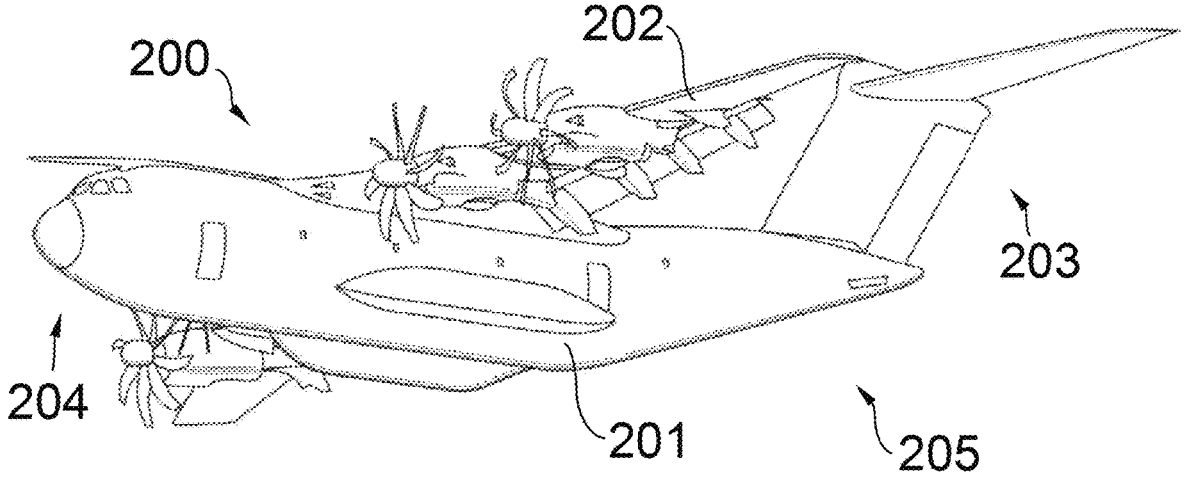
FIG. 11 shows an example aircraft designed as an airplane, in which a device for dropping water according to the example embodiment of FIGS. 1 and 2 can be used.
Figure 12:
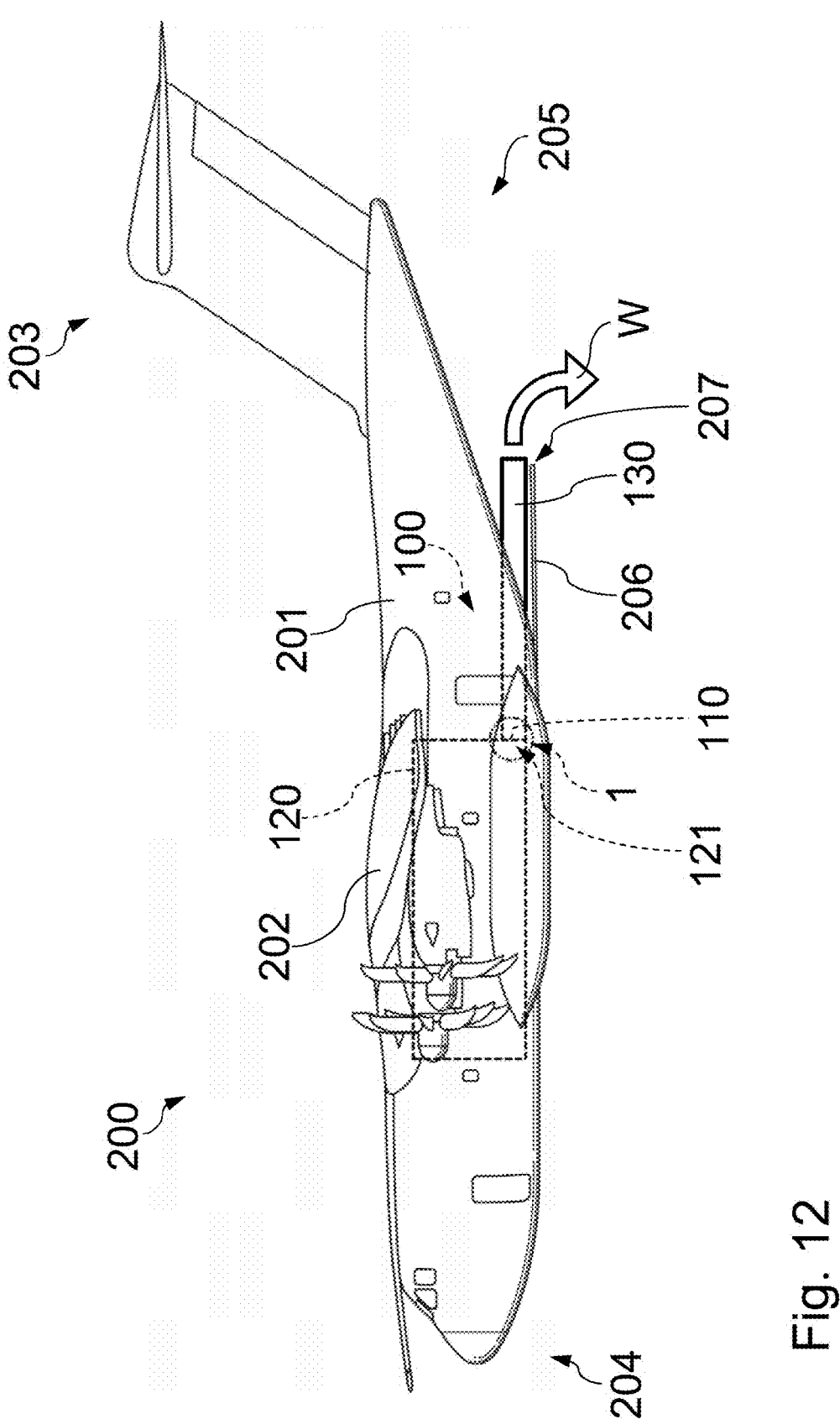
FIG. 12 shows the aircraft of FIG. 11 in a side view, with a tail ramp open, during the schematically illustrated dropping of water for firefighting purposes.

FIGS. 11 and 12 show an aircraft 200 designed as a transport aircraft. The aircraft 200 has a fuselage 201, wings

202, an empennage 203, a nose 204 and a tail 205. A cargo compartment is provided in the interior of the fuselage 201 and is accessible via a tail ramp 206, which is shown in an open state in FIG. 12.

The aircraft 200 is equipped with a device 100 for dropping water from the aircraft 200, the device being arranged and fixed, as a "roll-on-roll-off firefighter kit", in the cargo compartment. The device 100 can be introduced into and removed from the cargo compartment relatively easily, and in particular makes it possible for the aircraft 200 to be used temporarily or seasonally for firefighting purposes, for example for fighting vegetation fires such as forest or range fires.

The device 100 comprises a tank 120 for receiving water, wherein the water may be provided with suitable additives if necessary. The tank 120 may have a capacity of for example 20 t or approximately 20 cubic meters of water, wherein this value is to be understood as an example, and smaller or larger capacities are conceivable. The tank 120 is illustrated schematically in the figures, and it is self-evident that the shaping of the tank 120 and its arrangement within the cargo compartment may be adapted with regard to the accommodation and emptying thereof, and may differ from the shape that is merely schematically indicated in the figures.

FIG. 12 shows the aircraft 200 during flight with the tail ramp 206 open. It is clear here that the device 120 also has a pipe-like outlet line 130 through which the water contained in the tank 120 can flow out for the purposes of dropping the water during flight, as is schematically indicated in FIG. 12 by the arrow W. Here, the outlet line 130 extends from the tank 120 to a free end 207 of the tail ramp 206.

When the aircraft 200 is on the ground, the tank 120 can be driven into the cargo compartment and lashed therein. The line 130 can also be selectively secured in the cargo compartment and on the tail ramp 206 and removed again. On the ground, the tank 120, for example after being secured in the cargo compartment, can be filled for example using a fire hose or several such hoses. The line 130 may be articulated in certain regions in order to allow the movement of the tail ramp 206.

For the purposes of dropping water during flight, the water escapes from the tank 120 rapidly, that is to say with a high mass flow rate, through an outlet opening 121, which is merely schematically indicated in FIG. 12, and through the outlet line 130. The device 100 comprises a closure element 110, by which the outlet opening 121 can be selectively closed and opened up at the desired point in time for the purposes of dropping the water, and comprises an arrangement 1 for actuating the closure element 110, the arrangement also being merely schematically indicated in FIG. 12.

The arrangement 1 according to a first example embodiment of the disclosure herein will be described in more detail below on the basis of FIGS. 1 to 10.

Figure 2:
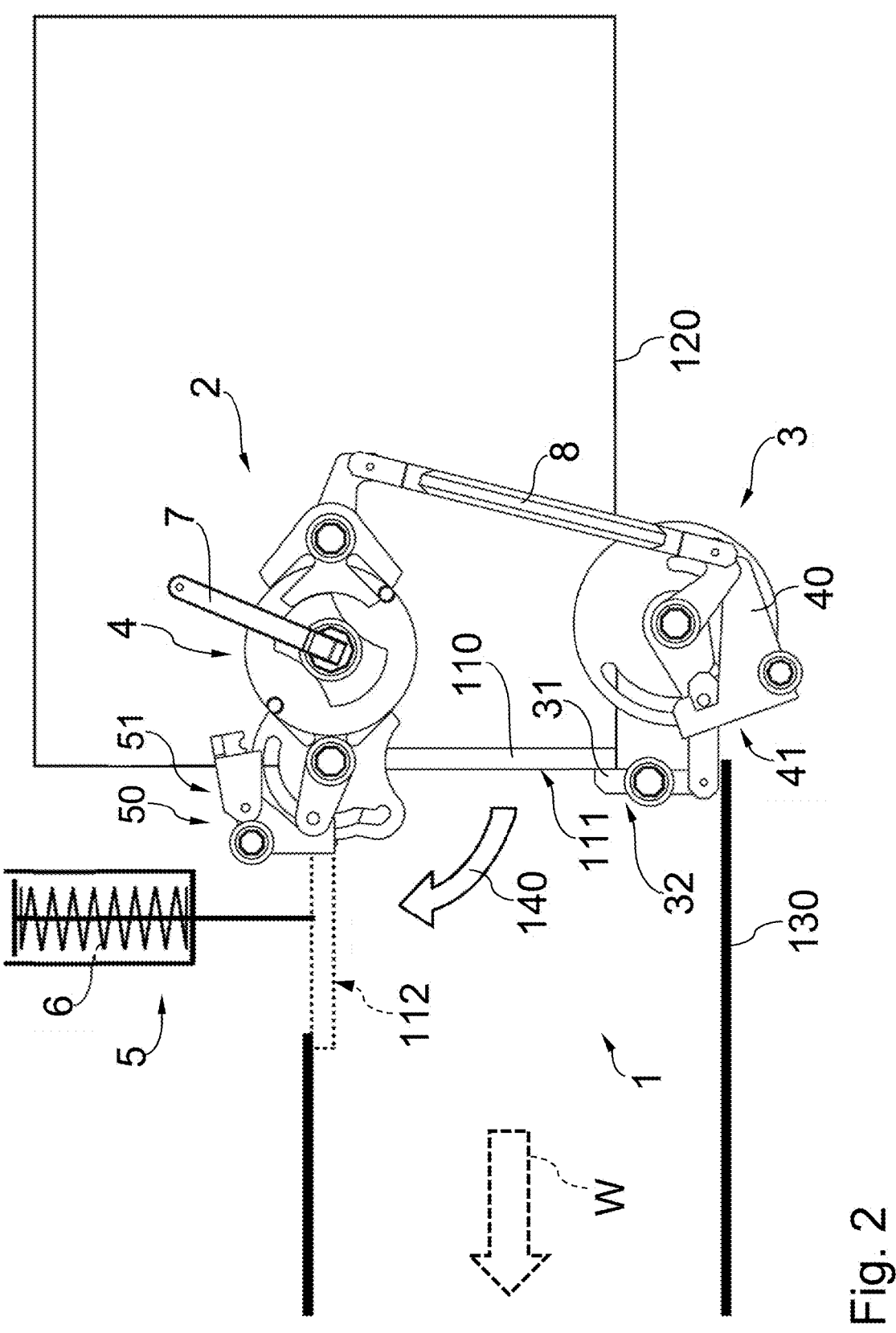
FIG. 2 shows the device according to the first example embodiment in the same state as in FIG. 1, with certain further components of the arrangement for actuating the closure element that serves for selectively closing and opening up the outlet opening being shown.

FIGS. 1 and 2 each indicate the tank 120, wherein it is self-evident that the shape and size of the tank 120 are illustrated merely schematically in these figures, and that the closure element 110, the outlet opening 121 and those components of the arrangement 1 which are discussed below are not shown true to scale relative to the dimensions of the tank 120.

FIGS. 1 and 2 show that the outlet opening 121 can be sealingly closed, or opened up for the purposes of releasing water, by the flap-like closure element 110, which is pivotable in an opening direction 140, for example through an angle of approximately 90 degrees, in order to be opened.

Here, a closed position 111 of the closure element 110 is shown using solid lines, and an opened position 112 of the closure element 110 is additionally shown using dashed lines, in FIGS. 1 and 2.

The arrangement 1 comprises a preload device 5, which is merely schematically shown in FIGS. 1 and 2 and which is configured with a spring element 6, for example a compression spring. The preload device 5 subjects the closure element 110 to an elastic force in the opening direction 140, such that the closure element 110, as it is closed, is preloaded in the direction 140. The preload device 5 thus assists the opening of the closure element 110 under the action of the water pressure of the filled tank 120.

FIGS. 1 and 2 schematically show the preload device 5 for the opened position 112 of the closure element 110. Further components of the arrangement 1 that are described further below are illustrated in FIGS. 1 and 2 in their positions for the closed position 111 of the closure element 110. Only a housing of the preload device 5 is visible in FIGS. 3A, 3B to 9A, 9B, wherein one or more spring element(s) are situated in the interior of the housing, and these figures show in more detail the articulated coupling of the preload device 5 to the closure element 110 by a joint and an arm 115 that is fixedly connected to the closure element 110.

Instead of a spring element 6 in the form of a compression spring, which acts on the closure element 110 via an arm such as the arm 115, it is possible in a variant that is not shown in the drawing for the preload device 5 to be formed with a spring, which is subjected as a whole to torsion loading, in the region of the axis of rotation.

The arrangement 1 enables an operating person ("loadmaster") to perform the following actuating operations using a single, common actuation element 7, which in the first example embodiment is designed as a lever that can be pivoted by the operating person by manual force:

closing the closure element 110 situated in the opened position 112, in order to close the outlet opening 121, before the tank 120 is initially filled for firefighting use, or for the purposes of refilling after a release of water;

locking the closure element 110 in the closed position 111 and fastening the locking against inadvertent unlocking;

unfastening the locking of the closed closure element 110, and unlocking the closure element 110 locked in the closed position 111, for the purposes of opening the closure element, when the tank 120 is full, in order to release water.

The opening operation is assisted here by the preload device 5 in order to achieve that the closure element 110 opens quickly. Here, the closure element 110 opens upwards in relation to the direction of gravitational force, whereby the closure element 110 does not constitute an obstruction in the flow of the water W. Furthermore, during the unlocking of the closure element 110, the arrangement 1 is brought by the actuation element 7 into a state in which the closure element 110 latches in the opened position 112 and is thus locked in the opened position 112, whereby the closure element 110 does not fall back into and undesirably influence the flow of the water W. For the closing of the closure element 110 again, the arrangement 1 furthermore makes it possible for the locking of the closure element 110 in the opened position 112 to be released by the actuation element 7.

Figures 3A, 3B:
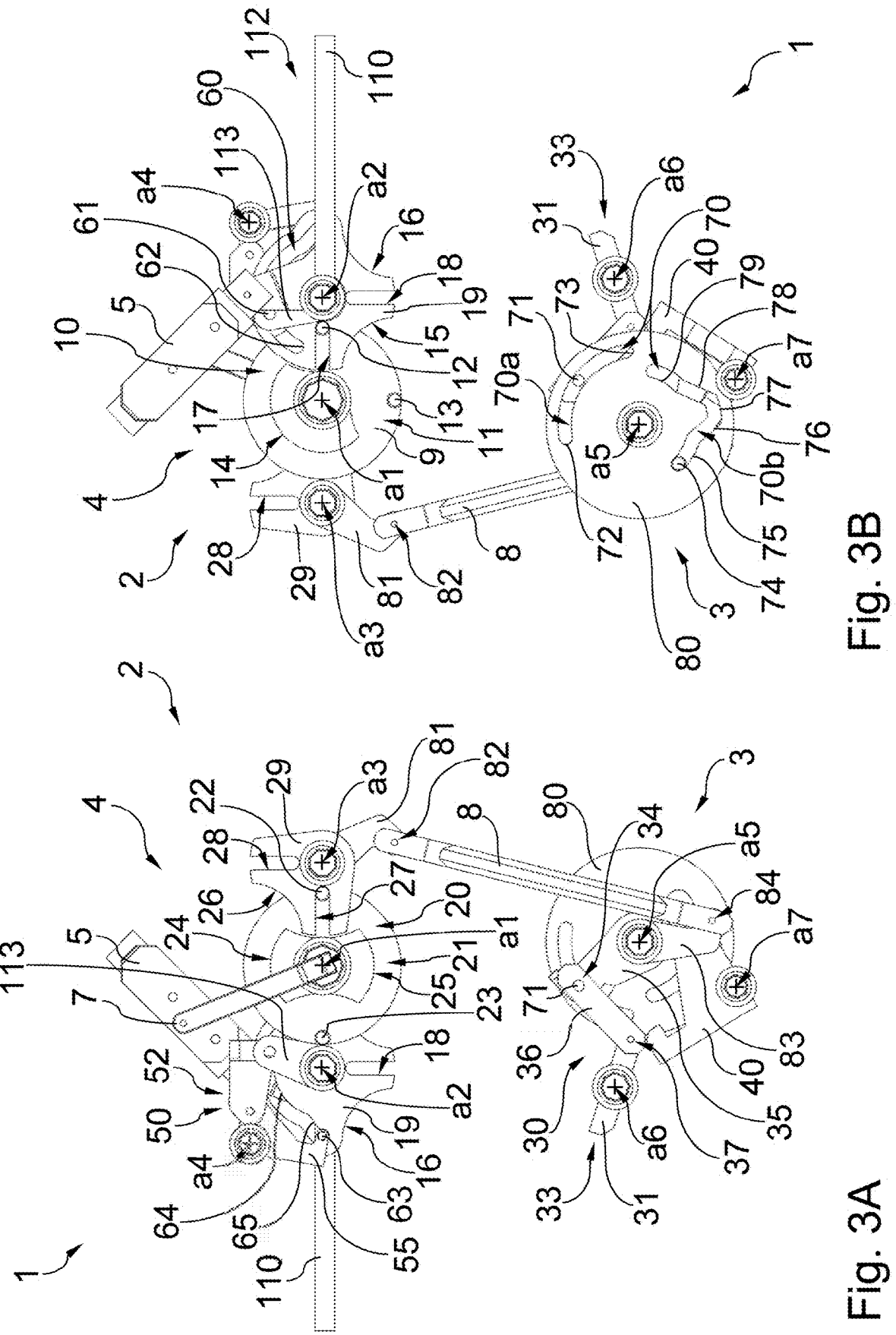
FIGS. 3A and 3B show the arrangement for actuating the closure element according to the first example embodiment in a side view from a first side and from a second side situated opposite the first side, with a pivotable, lever-like actuation element being situated in each case in a reference position in which the closure element is open.

FIGS. 3A, B to 9A, B show the arrangement 1 together with the closure element 110 in different states of actuation, with the tank 120 and the outlet line 130 having been omitted in order to give a better overview. FIGS. 3A to 9A show a front side of the arrangement 1, and FIGS. 3B to 9B show a rear side of the arrangement 1.

The arrangement 1 comprises a first partial mechanism 2 and a second partial mechanism 3, which are coupled to one another by a transmission element 8 designed for example as a rod.

The first partial mechanism 2 comprises a Geneva drive mechanism 4, which is configured with a first Geneva drive 10 and a second Geneva drive 20. A "Geneva drive" is referred to in German as a "Malteserkreuzgetriebe".

Here, the Geneva drive mechanism 4 has a drive element 9 of disc-like form with a circular outer contour. The actuation element 7 is connected rotationally conjointly to the drive element 9, which is supported so as to be rotatable about a first pivot axis a1. Pivoting of the actuation element 7 about the axis a1 thus causes a rotation of the drive element 9 about the axis.

On a first side of the drive element 9, visible in FIGS. 3B-9B, the drive element 9 forms a drive geometry 11 of the first Geneva drive 10. The drive geometry 11 has two first and second pins 12, 13, which are offset with respect to one another, for example by an angle of substantially 90 degrees, about the axis a1, and has a blocking sector which is in the form of a projection on the drive element 9 and which has an arcuate outer contour that forms a first blocking mechanism active surface 14. The pins 12, 13 serve for incrementally driving a first output element 19, which is supported so as to be rotatable about a second pivot axis a2, by virtue of the pins 12 and 13 engaging into a first radial slot 17 and a second radial slot 18, respectively, of the first output element 19. The disc-like output element 19 furthermore has a rounded recess 15 and a second blocking mechanism active surface 16, between which the second slot 18 is arranged. The active surface 16 is formed with a radius corresponding to that of the active surface 14, such that the active surface 14 can engage into the active surface 16 and thus temporarily block a rotation of the first output element 19. The drive geometry 11 may be formed integrally with the drive element 9, or the blocking sector and/or the pins 12, 13 may be formed as separate elements and fixedly connected to the drive element 9.

On a second side of the drive element 9, visible in FIGS. 3A-9A, the drive element 9 forms a drive geometry 21 of the second Geneva drive 20. The drive geometry 21 has two third and fourth pins 22, 23, which are offset with respect to one another, for example by an angle of substantially 180 degrees, about the axis a1. The drive geometry 21 furthermore has a projection on the drive element 9, which projection has two interconnected, oppositely situated sectors each having an arcuate outer contour. One of the sectors forms a blocking sector, the arcuate outer contour of which forms a third blocking mechanism active surface 24. FIG. 3A furthermore shows the rounded outer contour 25 of the other sector. The pins 22, 23 serve for incrementally driving a second output element 29, which is supported so as to be rotatable about a third pivot axis a3, by virtue of the pins 22, 23 engaging into a third radial slot 27 and a fourth radial slot 28, respectively, wherein the slots 27 and 28 are formed in the second output element 29. The disc-like second output element 29 furthermore has a fourth blocking mechanism active surface 26, which is arranged between the third slot 27 and the fourth slot 28. The active surface 24 is formed with a radius corresponding to that of the active surface 26, such that the active surface 24 can engage into the active surface 26 and thus temporarily block a rotation of the second output element 29. The drive geometry 21 may be formed integrally with the drive element 9, or the sectors and/or the pins 22, 23 may be formed as separate elements and fixedly connected to the drive element 9.

The drive geometries 11 and 21 can be moved conjointly by the actuation element 7. If the actuation element 7 is pivoted by the operating person within a predefined angle range, which is illustrated by way of example in FIG. 10 and which in the first example embodiment has a value of substantially 195 degrees, then the two output elements 19 and 29 perform rotations or remain stationary, in each case in a predefined sequence, in accordance with the arrangement of the pins 12, 13, 22, 23 and the arrangement and dimensions of the slots 17, 18, 27, 28 and of the locking mechanism active surfaces 14, 16, 24, 26.

The first output element 19 is equipped, in a main surface of extent thereof, with a first control geometry 60. Here, the control geometry 60 has a first region 64, which is formed with a constant radius about the pivot axis a2 and which forms the major part of the control geometry 60. The control geometry 60 furthermore has a second region 65, in which the radius with respect to the pivot axis a2 varies, and a third, small region 66, again with a constant radius. The radius of the control geometry 60 relative to the axis a2 is greater in the third region 66 than in the first region 64. The control geometry 60 is formed as a slot that has regions 64, 65 and 66 that adjoin one another in continuous fashion.

An engagement element 61, which is for example of pin-like form, engages into the slot-like control geometry 60. The engagement element 61 is secured to an arm 113 that is connected rotationally conjointly to the closure element 110, wherein the closure element 110 and the arm 113 are supported so as to pivotable about the second pivot axis a2.

A latching assembly 50 is furthermore supported so as to be pivotable about a fourth pivot axis a4. The latching assembly 50 can assume a latching-ready position 52 in which the engagement element 61 engaging into the control geometry 60, or an engagement portion arranged adjacent to the engagement element on the arm 113, can latch behind an edge 54 of a latch 53, wherein the edge 54 prevents a backward movement of the engagement element 61 and of the arm 113; see FIG. 3A. The latching assembly 50 can furthermore assume a release position 51, see for example FIG. 4A, in which the engagement element 61 can move past the edge 54. The latching assembly 50 can be pivoted about the axis a4 between the positions 51 and 52. For this purpose, the latch 53 is coupled to an arm 55, wherein an engagement element 63, which is for example of pin-like form, is arranged on the arm 55 adjacent to a free end of the arm 55 and also engages into the first control geometry 60.

The second output element 29 is coupled rotationally conjointly to an arm 81 and is rotatable together with the arm 81 about the axis a3. At an articulated connection 82 adjacent to a free end of the arm 81, the arm 81 is connected to the transmission element 8.

The second partial mechanism 3 comprises a control element 80, which is supported so as to be rotatable about a fifth pivot axis a5 and which is in particular of disc-like form with a rounded outer contour, and also a fastening hook 40 and a locking partial mechanism 30.

The control element 80 is coupled rotationally conjointly to an arm 83, wherein the arm 83 is also supported so as to be pivotable about the axis a5. A movement of the arm 83 thus causes a rotation of the control element 80 about the axis a5. At an articulated connection 84 adjacent to a free end of the arm 83, the arm 83 is connected to the transmission element 8.

The locking partial mechanism 30 comprises a locking element 31, which is movable pivotably about a sixth pivot axis a6 and by which the closure element 110—see in particular FIGS. 1 and 2—can be locked in the closed position 111. A locking position 32 of the locking element 31 is shown in FIGS. 1, 2 and 6A, 6B to 9A, 9B. By contrast, FIGS. 3A, 3B to 5A, 5B show the locking element 31 in its unlocking position 33, in which the closure element 110 is closed but can open.

The axis a6 is arranged approximately in the middle region of the locking element 31. A first end region 38 of the locking element 31, which first end region acts on the closure element 110 when the latter is locked, and a second end region 39 of the locking element 31 are arranged opposite one another in relation to the sixth pivot axis a6, see for example FIGS. 4A and 6A.

The locking partial mechanism 30 furthermore has an arm 35 that is supported so as to be pivotable about the fifth pivot axis a5. Here, the arm 35 is not connected rotationally conjointly to the control element 80, but is supported so as to be freely rotatable about the axis a5. An intermediate member 36 of the locking partial mechanism 30 is connected, at one end thereof, to a free end of the arm 35 at an articulated connection 34, whereas the intermediate member 36 is connected, at the other end thereof, to the second end region 39 of the locking element 31 at an articulated connection 37.

The locking partial mechanism 30 is thus designed such that, when the locking element 31 is moved from the locking position 32 into the unlocking position 33 or vice versa, the locking partial mechanism passes through a dead center. In the articulation axis of the articulated connection 34, the locking partial mechanism 30 has an engagement element 71 which is for example of pin-like form, wherein the locking partial mechanism 30 can be pushed beyond the dead center from both sides by virtue of load being exerted on the engagement element 71.

The fastening hook 40 is designed for example as a flat element, and is supported so as to be pivotable about a seventh pivot axis a7. The fastening hook 40 can be moved into a fastening position 41 and an unfastening position 42 by being pivoted about the axis a7. For this purpose, the fastening hook 40 has an engagement element 74, which is for example of pin-like form, at an end region 43. The fastening hook 40 and thus a hook structure 44 thereof are pivoted about the axis a7 by virtue of load being exerted on the engagement element 74.

A second control geometry 70 is formed in the flat, disc-shaped control element 80, wherein the second control geometry 70 has a first part 70a and a second part 70b. The mutually separate parts 70a, 70b are each formed in the manner of a groove or slot in the control element 80.

The first part 70a is designed so as to follow a path in the form of a segment of an arc with a constant radius in relation to the fifth pivot axis a5. The engagement element 71 engages into the first part 70a.

By contrast, the second part 70b is formed with a bent basic shape, wherein the main bend in the basic shape points towards an outer edge of the control element 80. Considered in greater detail, the part 70b has a first region 75, a second region 76, a third region 77, a fourth region 78 and a fifth region 79. In the first, third and fifth regions 75, 77 and 79, the radius of the path of the slot-like second part 70b is in each case constant in relation to the fifth pivot axis a5, wherein the radius in the first and the fifth regions 75 and 79 is in each case smaller than the radius in the third region 77.

In the second region 76 and the fourth region 78, the radius of the path of the part 70b in relation to the axis a5 varies, wherein the second region 76 forms a transition from the first region 75 to the third region 77, and the fourth region 78 forms a transition from the third region 77 to the fifth region 79. The regions 75, 76, 77, 78 and 79 adjoin one another in continuous fashion in this sequence. The engagement element 74 engages into the part 70*b*.

The functioning of the arrangement 1 will be described below with reference to FIGS. 3A, 3B to 9A, 9B and FIG. 10.

In FIGS. 3A, B, the closure element 110 is in the opened position 112. This may for example be a point in time immediately after the water contained in the tank 120 has been dropped and the tank 120 has been emptied. The actuation element 7 is situated in a position which will hereinafter be used as a reference position and referred to as a 0-degree position s0.

Figures 4A, 4B:
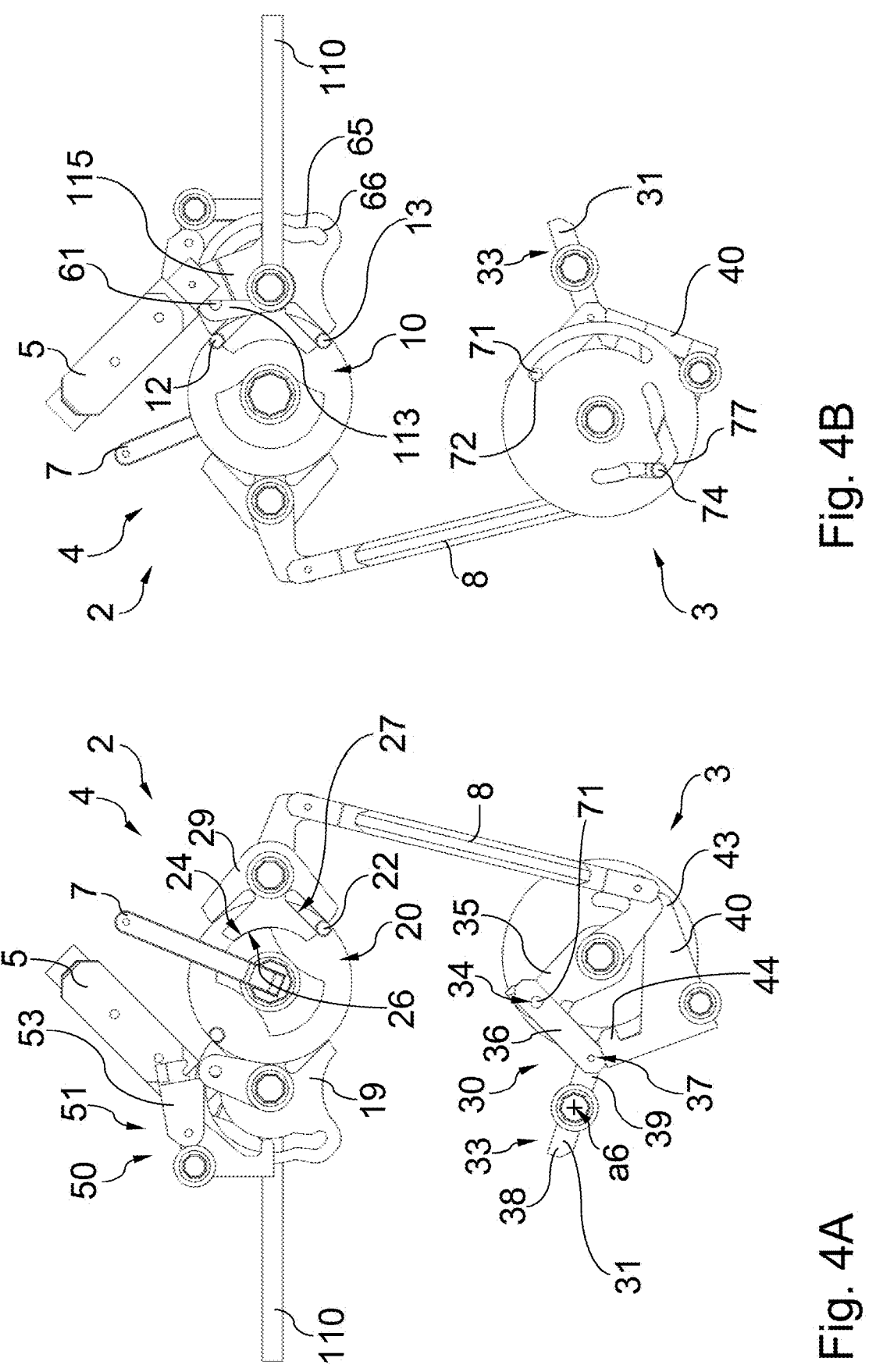
FIGS. 4A and 4B show the arrangement for actuating the closure element according to the first example embodiment in side views analogous to FIGS. 3A and 3B, in a state following FIGS. 3A and 3B and with the actuation element positioned in each case at 45 degrees relative to the reference position.

For the next use, the closure element 110 is closed. For this purpose, the operating person pivots the actuation element 7 into a 45-degree position s45, and the actuation element 7 has thus, in the position s45, been pivoted through 45 degrees relative to s0. FIGS. 4A, B show the arrangement 1 in the position s45. In the 0-degree position s0, the first pin 12 is in engagement with the first slot 17, and the third pin 22 is in engagement with the third slot 27. As a result of the pivoting movement from s0 to s45, the drive element 9 is rotated about the axis a1. The interaction of pin 12 and slot 17 causes the output element 19 to be rotated about the axis a2, whereby the first control geometry 60 is rotated about the axis a2. The engagement element 63, which position s0 is situated in the third region 66, is pulled by the second region 65 to a smaller radius in relation to the axis a2 than in the third region 66. At this smaller radius, the engagement element 63 remains in the first region 64. The latching assembly 50 is thus pivoted about the axis a4, and the engagement of the latch 53 and of the engagement element 61, or alternatively of the engagement portion, which engagement has caused the closure element 110 to be locked in the open position 112, is thus released. As a result of the movement of the control geometry 60, the engagement element 61 moves in and relative to the first region 64, wherein the constant radius in the region 64 between s0 and s45 means that no load is exerted on the engagement element 61. In the position s45, the engagement element 61 just bears against an end-side portion 62, formed as an end, of the slot-like first control geometry 60.

At the same time, at the transition from s0 to s45, the interaction of pin 22 and slot 27 causes the second output element 29 to be rotated about the third pivot axis a3, whereby the arm 81 pivots about the axis a3 and transmits this movement by the transmission element 8 to the control element 80. Via the arm 83, the control element 80 is pivoted about the axis a5, whereby the second control geometry 70 also performs a rotational movement about the axis a5. In position s0, see FIG. 3B, the engagement element 74 is situated in the first region 75 of the second part 70*b* of the second control geometry 70. During the movement from s0 to s45, the engagement element 74 runs along the second region 76 in the direction of a larger radius in relation to the axis a5, whereby the fastening hook 40 pivots about the pivot axis a7.

In positions s0 and s45, the locking element 31 is situated in its unlocking position 33. Engagement of the fastening hook 40 into the locking partial mechanism 30 does not occur during the movement from s0 to s45, especially since the engagement element 71, or the engagement portion situated adjacent thereto, is not situated within the reach of the hook structure 44.

At the same time, during the movement from s0 to s45, the engagement element 71 at the articulated connection 34 of the locking partial mechanism 30, or alternatively the engagement portion arranged there, runs in the first part 70*a*, with initially no load being exerted on the engagement element 71.

In the 45-degree position s45 of the actuation element 7, the engagement element 71 is just situated at an end-side portion 72, formed as an end, of the slot-like first part 70.

FIG. 4A furthermore shows that, in the position s45, the third pin 22 is already exiting the third slot 27, and the blocking mechanism active surfaces 24 and 26 have already entered into engagement with one another and are blocking the pivoting position of the second output element 29.

Figure 5B:
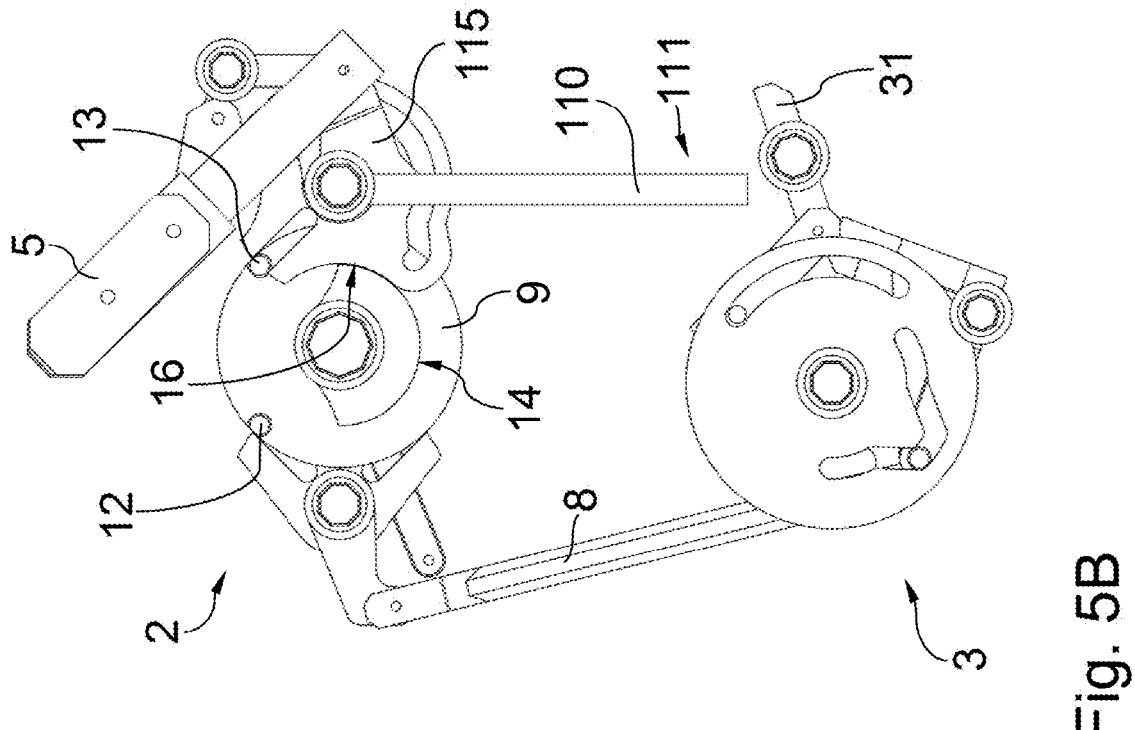
FIGS. 5A and 5B show the arrangement for actuating the closure element according to the first example embodiment in side views analogous to FIGS. 3A and 3B, in a state following FIGS. 4A and 4B and with the actuation element positioned in each case at 135 degrees relative to the reference position.
Figure 5A:
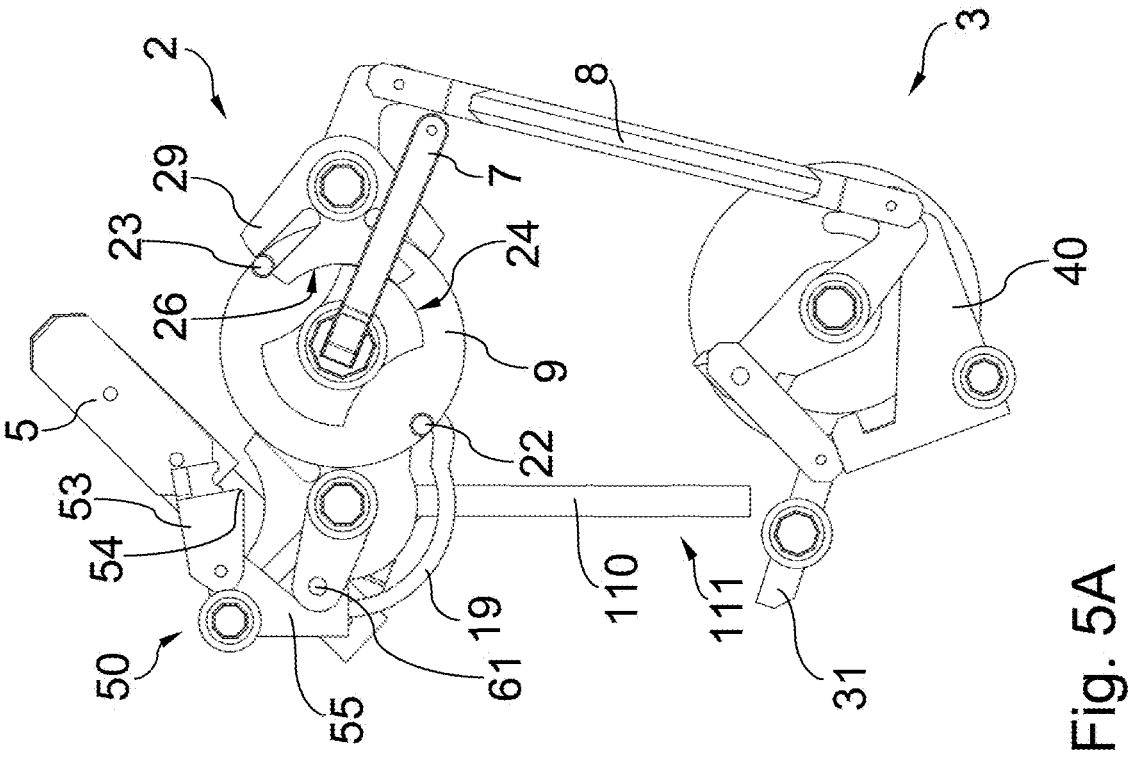
Figure 10:
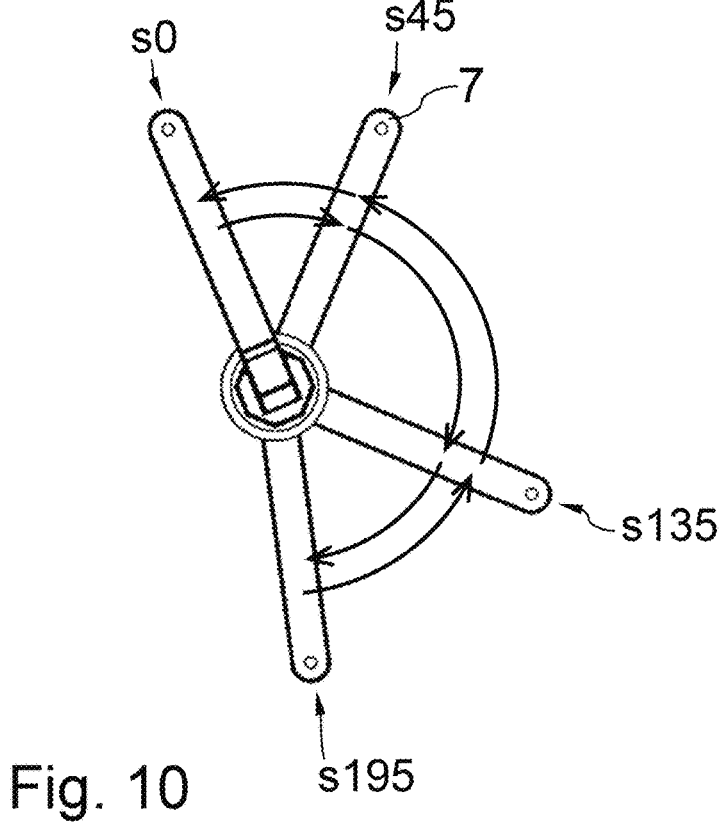
FIG. 10 is a schematic illustration of the actuation of the actuation element of the first example embodiment on the basis of angular positions thereof, with the reference position of 0 degrees and positions of 45, 135 and 195 degrees relative to the reference position being illustrated.

As the actuation element 7 pivots further about the pivot axis a1 into the 135-degree position s135, see FIG. 10 and FIGS. 5A, 5B, in which the actuation element 7 has been pivoted through 135 degrees proceeding from the reference position s0, the first output element 19 is driven by the first Geneva drive 10 whilst the second output element 29 is blocked by the interacting blocking mechanism active surfaces 24, 26 so as to be prevented from pivoting.

During the movement from s45 to s135, the closure element 110 is pivoted about the axis a2 into its closed position 111. The preload device 5 is thus placed under load at the same time. For this purpose, during the further rotation of the first output element 19 that is achieved by way of an interaction of the second pin 13 with the second slot 18, the engagement element 61 bearing against the end-side portion 62 of the first control geometry 60 is driven along an arcuate path by the first control geometry 60. The engagement element 61, which is coupled to the closure element 110 via the arm 113, therefore pivots the closure element 110 into the closed position 111, and allows a compression force to be applied to a seal (not illustrated in the figures) in the edge region of the outlet opening 121.

Figure 6B:
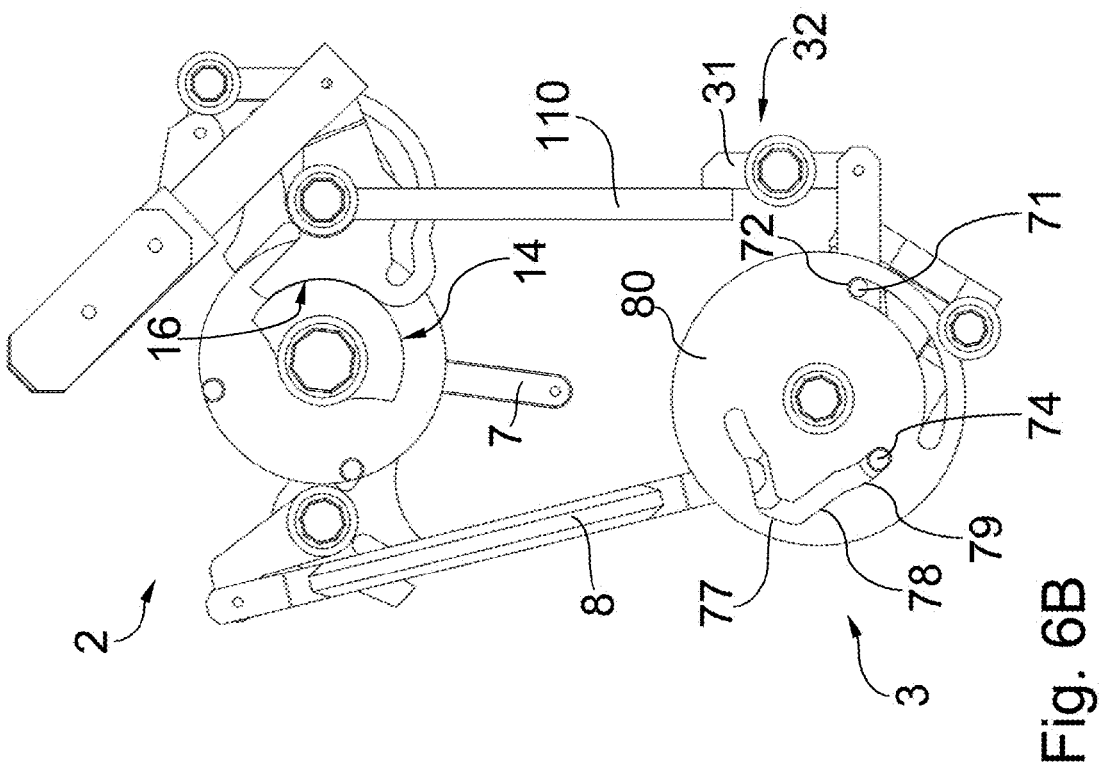
FIGS. 6A and 6B show the arrangement for actuating the closure element according to the first example embodiment in side views analogous to FIGS. 3A and 3B, in a state following FIGS. 5A and 5B and with the actuation element positioned in each case at 195 degrees relative to the reference position.
Figure 6A:
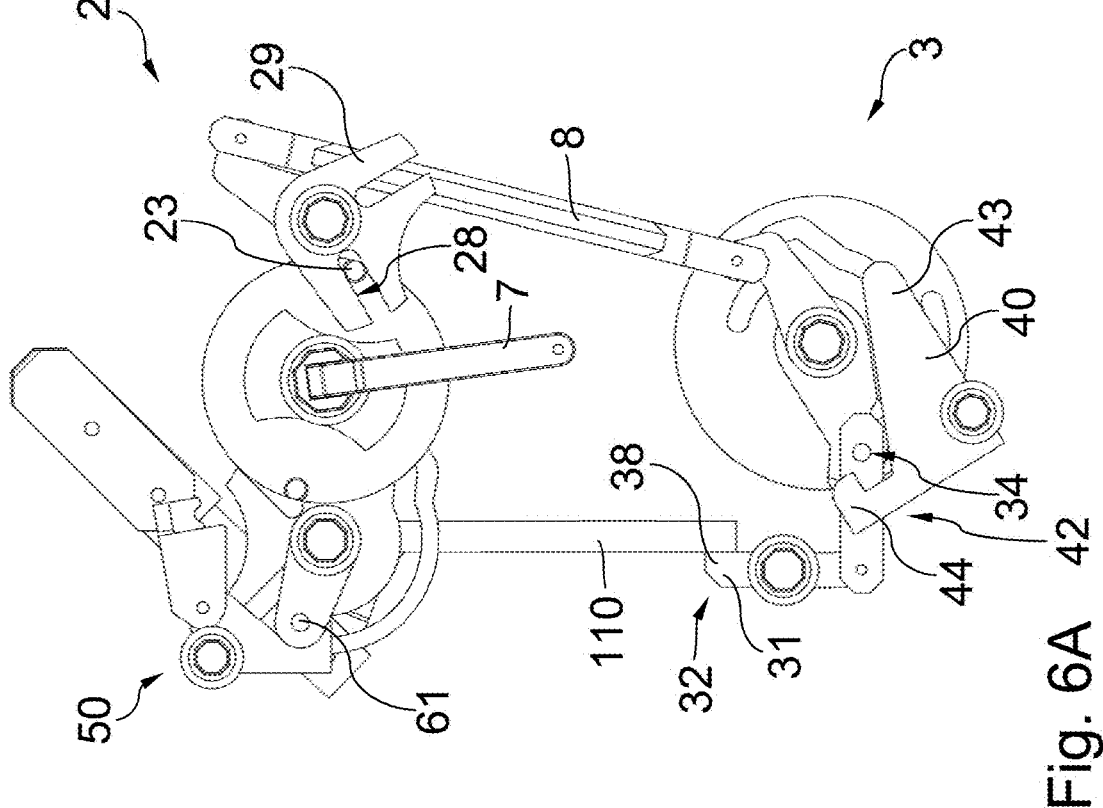

As the actuation element 7 is pivoted further from the 135-degree position s135 into a 195-degree position s195, in which the actuation element 7 has been rotated through an angle of 195 degrees about the axis a1 relative to the reference position so-see FIGS. 5B, 6B—the first output element 19 is then blocked against pivoting further by virtue of the blocking mechanism active surfaces 14 and 16 engaging into one another. Furthermore, during the movement from s135 to s195, during which the closure element 110 is already situated in the closed position 111, the locking element 31 is pivoted into the locking position 32. For this purpose, see FIGS. 5A and 6A, the active surfaces 24 and 26 disengage again, whilst the fourth pin 23 engages with the fourth slot 28. During the movement from s135 to s195, the second output element 29 thus performs a further pivoting movement, which is transmitted via the arm 81, the transmission element 8 and the arm 83 to the control element 80.

The control element 80 thus pivots again about the axis a5. Here, the engagement element 71 bearing against the first portion 72 of the first part 70*a* is driven along a substantially arcuate path in a first direction, whereby the locking partial mechanism 30 is pushed beyond the dead center situation and the locking element 31 pivots into its locking position 32. At the same time, the engagement element 74 of the fastening hook 40 passes through the third, fourth and fifth regions 77, 78 and 79 of the second part 70*b* of the second control geometry 70. The fastening hook 40 thus pivots such that the hook structure 44 does not collide with the engagement element 71 in the region of the articulated connection 34 as the partial mechanism 30 is moved beyond the dead center situation, see for example FIG. 6A.

Figures 7A, 7B:
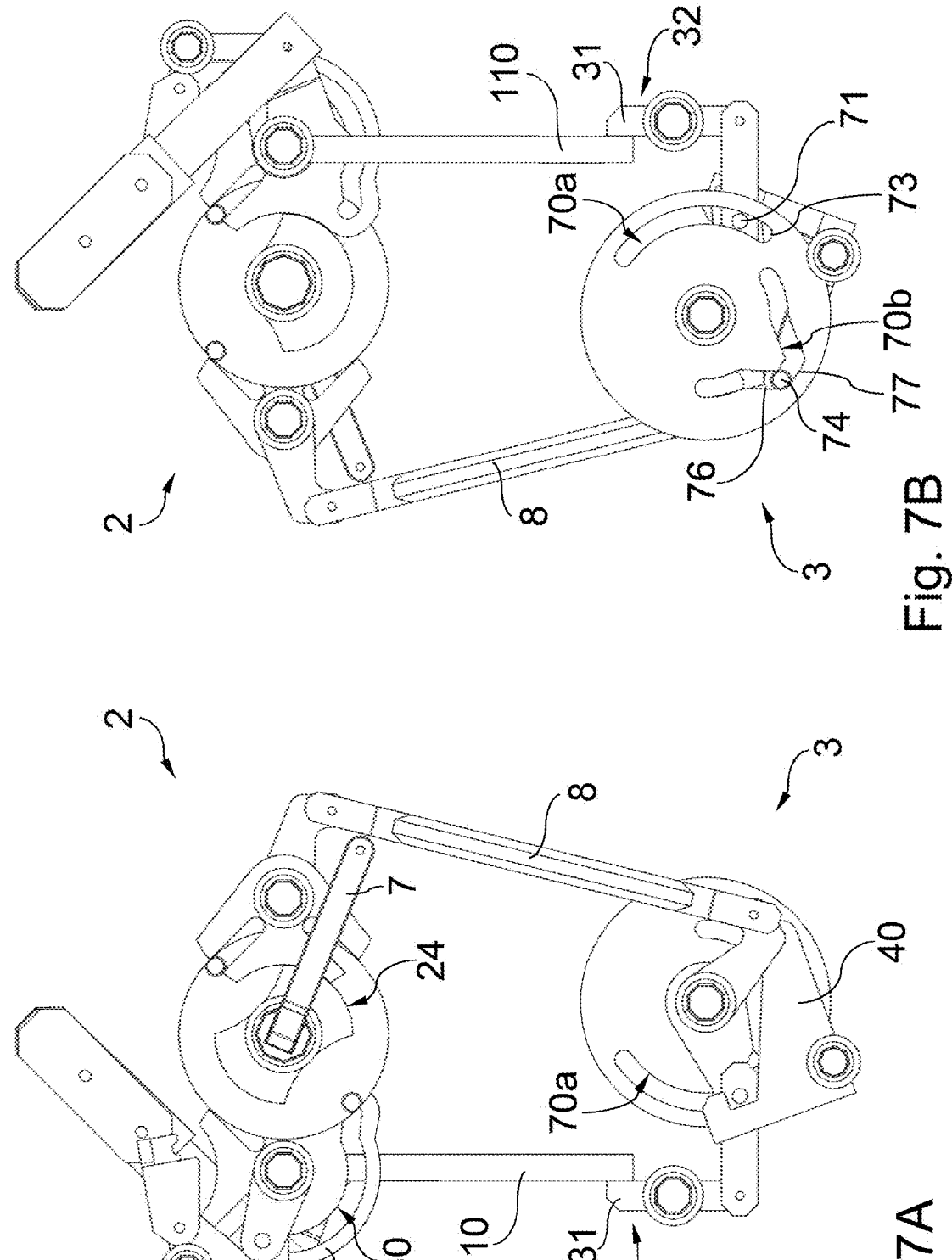
FIGS. 7A and 7B show the arrangement for actuating the closure element according to the first example embodiment in side views analogous to FIGS. 3A and 3B, in a state following FIGS. 6A and 6B and with the actuation element positioned in each case at 135 degrees relative to the reference position.

From the position s195, the actuation element 7 is pivoted by the operating person back into the 135-degree position s135, see FIGS. 7A, 7B. The extent of the first part 70a of the second control geometry 70 is selected such that, during this process, no load is exerted on the engagement element 71. The locking partial mechanism 30 thus remains in its configuration with the locking element 31 in the locking position 32. At the same time, during the movement from s195 to s135, the engagement element 74 passes through the regions 79, 78 and 77 again in the reverse sequence in relation to before, and moves to a larger radius relative to the axis a5. The fastening hook 40 thus pivots in, and the hook structure 44 can engage around a portion, formed for this purpose, of the engagement element 71 or around a separate engagement portion, which is also arranged at the articulated connection 34, of the locking partial mechanism 30. This configuration is shown in FIG. 7A. The locking partial mechanism 30 and the locking element 31 are thus fastened so as to prevent inadvertent release of the locking of the closure element 110.

Figures 8A, 8B:
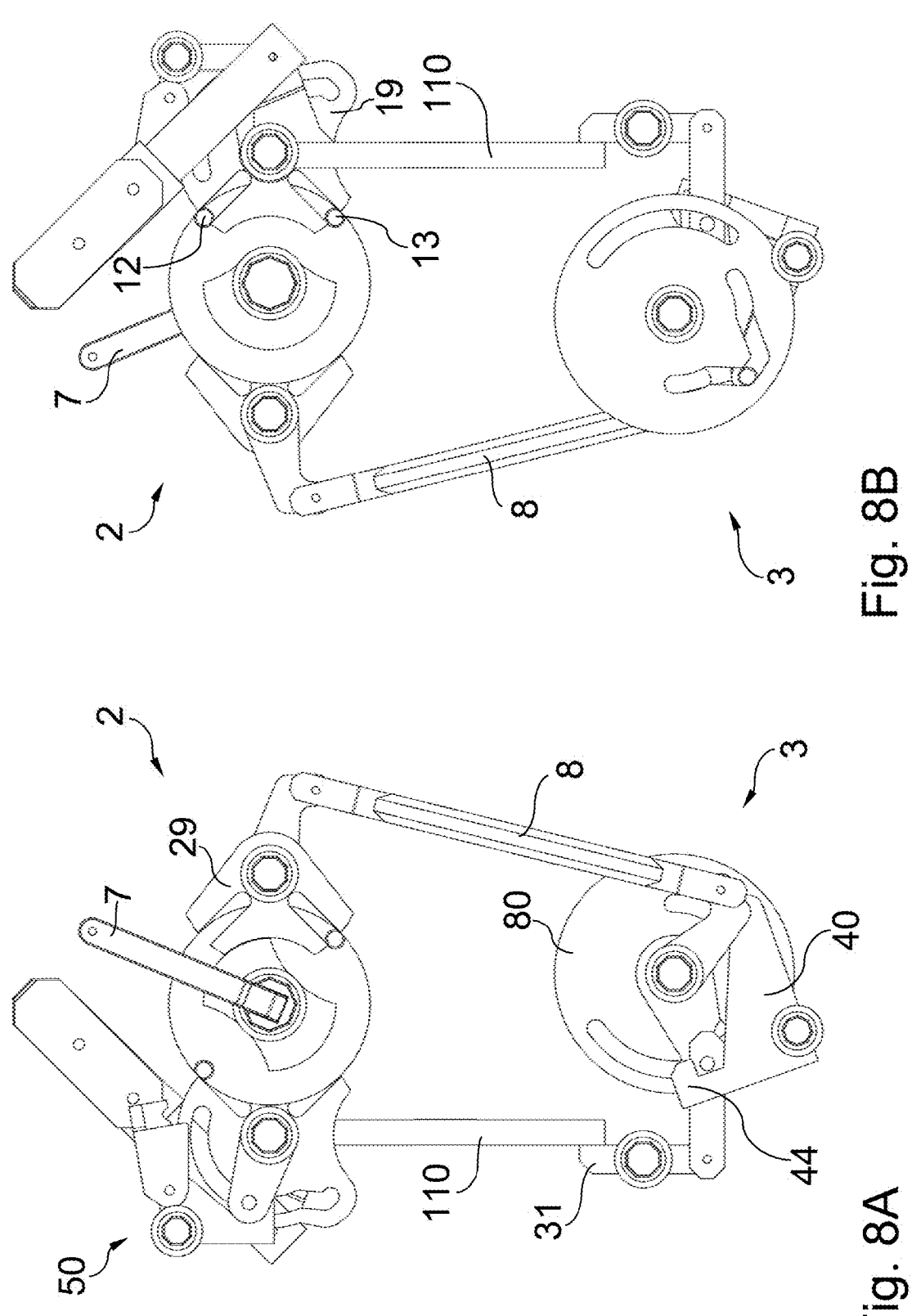
FIGS. 8A and 8B show the arrangement for actuating the closure element according to the first example embodiment in side views analogous to FIGS. 3A and 3B, in a state following FIGS. 7A and 7B and with the actuation element positioned in each case at 45 degrees relative to the reference position.

As the actuation element 7 pivots back further from the 135-degree position s135 into the 45-degree position s45, the second output element 29 is again blocked so as to be prevented from pivoting, see FIGS. 7A, 8A. However, during the movement from s135 to s45, the first output element 19 is pivoted back about the second pivot axis a2, wherein the engagement element 61 that is coupled to the closure element 110 remains stationary and the first control geometry 60 moves relative to the engagement element 61 such that the engagement element passes through the first control geometry 60 only within the first region 64, which is formed with a constant radius relative to the axis a2. The first control geometry 60 therefore does not act on the engagement element 61 in this case. The locking of the closure element 110 therefore does not impede the movement of the first output element 19 here.

In the situation shown in FIGS. 8A, 8B, the locking partial mechanism 30 remains fastened, by the fastening hook 40, so as to be prevented from moving beyond the dead center in the unlocking direction.

Figure 9B:
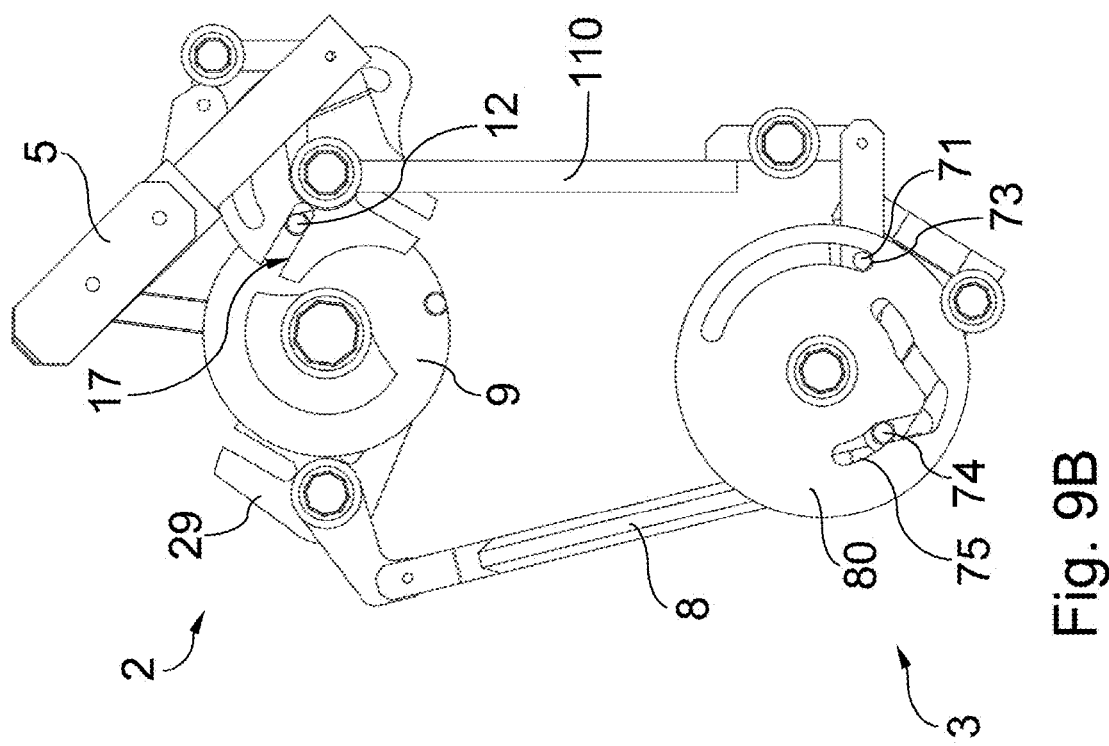
FIGS. 9A and 9B show the arrangement for actuating the closure element according to the first example embodiment in side views analogous to FIGS. 3A and 3B, in a state following FIGS. 8A and 8B and with the actuation element positioned in each case at 15 degrees relative to the reference position.
Figure 9A:
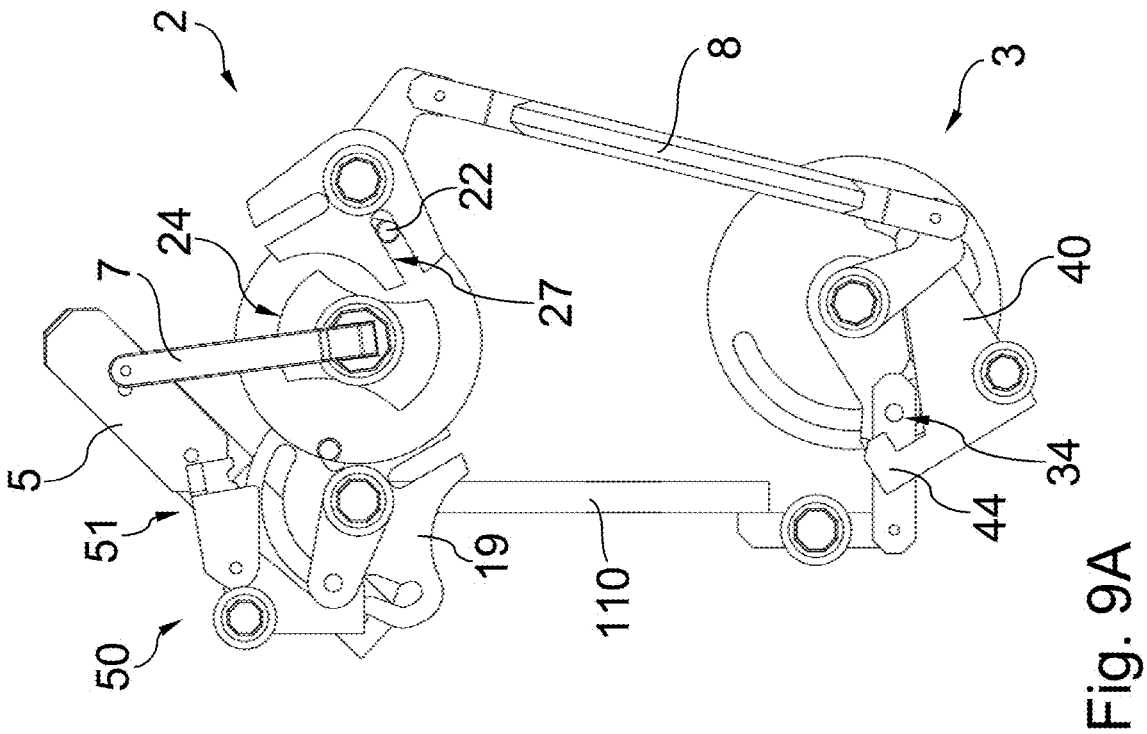

Following arrival at the deployment area, it is intended that the water, with or without additives, situated in the tank 120 be dropped by virtue of the outlet opening 121 being opened. For this purpose, the actuation element 7 is pivoted by the operating person from the 45-degree position s45 into the 0-degree position s0. FIGS. 9A and 9B show an intermediate state in which the actuation element is at an angle of 15 degrees relative to the reference position s0. The blocking of the second output element 29 so as to prevent it from pivoting has been eliminated, and the third pin 22 acts on the third slot 27 and rotates the second output element 29. The pivoting movement is again transmitted by the transmission element 8 to the control element 80, which is rotated about the axis a5. In the situation shown in FIGS. 9A, 9B, the engagement element 71 arranged in the region of the articulated connection 34 of the locking partial mechanism 30 bears against a second end-side portion 73, formed as an end, of the first part 70a of the second control geometry 70. Furthermore, in FIGS. 9A, 9B, the control element 80 has been rotated to such an extent that the engagement element 74 of the fastening hook 40 has passed through the second region 76 of the second part 70b of the second control geometry 70 and is entering the first region 75 again. Thus, during the movement from s45 into the 15-degree position in FIGS. 9A, 9B, the engagement element 74 has been moved so as to assume a relatively large spacing to the axis a5 again, the fastening hook 40 has been pivoted about the axis a7, and the hook structure 4 has been disengaged from the engagement element 71, or from the engagement portion that is alternatively provided in the region of the connection. Thus, in the state of FIGS. 9A, 9B, the locking partial mechanism 30 has been unfastened. As a result of a further movement of the actuation element 7 into the 0-degree position, the locking partial mechanism 30 is moved along a short arcuate path beyond the dead center as a result of the engagement element 71 being driven along by the portion 73 in a second direction. The locking element 31 can thus pivot open. The closure element 110 can thus open under the action of the water pressure in the tank 120 and with assistance from the preload device 5.

In the state in FIGS. 9A, 9B, the engagement element 63 of the latching assembly 50 is, as a result of the further rotation of the first output element 19, too, on the verge of entering the second region 65 of the first control geometry 60, in which the radius of the slot-like geometry 60 in relation to the axis a2 increases. If the actuation element 7 is then moved further into the position s0, then the latching assembly 50 pivots about the fourth pivot axis a4, and returns into its latching-ready position 52, by virtue of the engagement element 63 being guided to the larger radius by the control geometry 60. The rapidly opening closure element 110 is fixedly connected via the arm 113 to the engagement element 61, and the engagement element can latch behind the edge 54 of the latch 53, which is for example movable in spring-loaded fashion relative to the arm 55 and articulatedly connected to the arm 55, but cannot move back any further. In this way, the opened closure element 110 is locked again in the open position 112, and the water can flow out, unimpeded, through the outlet line 130.

The arrangement 1 according to the first example embodiment thus makes it possible, using a single actuation element 7 designed as a lever that is pivotable with an angle range of approximately 195 degrees, to perform the following:

the closing of the closure element 110 and the effecting of the opening thereof, the closing and opening of the locking partial mechanism 30, which has a dead center situation, the fastening and unfastening of the locking partial mechanism 30 by the fastening hook 40, the locking and unlocking of the closure element 110 in an opened position 112 by the latching assembly 50.

The pivotable angle range of 195 degrees results in separate, successive actuation of the individual mechanisms, and demonstrates, by way of example, a possible sequence of the operations in the corresponding positions. By utilizing the non-linear transmission of a rotational movement, which is characteristic of a Geneva drive, taking into consideration the chronological dependencies of the various operations, the interaction of the first and second Geneva drives by way of a superposition of the actuation of the individual mechanisms can be used in one variant to adapt, and in this case in particular decrease, the pivotable angle range of the actuation element 7. The change may be implemented by adapting the position of the pins 22 and 23 with respect to one another and the arrangement of the pins 12, 13 relative to the pins 22, 23.

Summarized briefly, in the first example embodiment described above, the following operations are implemented in the positions s0, s45, s135, s195 of the actuation element 7 for one working cycle of the arrangement 1:

Position s0:

The closure element 110 is open, the latching assembly 50 is closed, or in other words in the latching-ready position 52, the preload of the preload device 5 has been released and the spring element 6 has been at least partially relieved of load, the locking partial mechanism 30 is open, and the fastening hook 40 is open.

Position s45:

The latching assembly 50 is in the release position 51, and thus open.

Position s135:

The closure element 110 is closed, the preload device 5 is preloaded, and the spring element 6 is under load.

Position s195:

The locking portion mechanism 30 is closed, and the locking element 31 is thus in its locking position 32.

Position s135:

The fastening hook 40 is closed and thus fastens the locking partial mechanism 30.

Position s45:

The device 100 is ready for dropping water.

Position s0:

The fastening hook 40 is open or in an unfastening position, the locking partial mechanism 30 is open, the closure element 110 is open, the latching assembly 50 is in its latching-ready position, and the spring force of the preload device 5 has been released. Water is rapidly released.

The arrangement 1 and the device 100 equipped therewith can advantageously be operated easily by a single operating person or a "loadmaster", and the operational readiness of the device 100 can be quickly and easily restored, in order for the tank 120 to be refilled, already during the return flight after the dropping of water.

The arrangement 1 is furthermore conducive to implementing a sealing concept in which a seal in the region of the outlet opening 121 is compressed as the closure element 110 is closed, because sufficient force can be applied by the mechanism.

The device 100 described above with regard to the first example embodiment illustrated in FIGS. 1-12 is mobile and, in the form of an equipment set and/or in the form of a finished, fully functional assembly, can be introduced into and fixed in the cargo compartment of the aircraft 200 or removed from the cargo compartment and stored for reuse. The aircraft 200 can therefore be used highly flexibly for firefighting from the air. Furthermore, the necessary expenditure on the aircraft for this purpose is low. The arrangement 1 for actuating the closure element 110 implements the described actuation operations purely mechanically and using a single, common actuation element 7. The working effort for the operator is thus greatly reduced, and interfaces to electrical, hydraulic or pneumatic systems in the aircraft 200 are not required for the actuation of the closure element 110.

Although the design of the device 100 is highly advantageous for temporary use in the cargo compartment as required, as described immediately above, it is possible in variants for the arrangement 1 to likewise be used for actuating a closure element that serves for selectively closing and opening up an outlet opening of a tank, which is permanently installed in an aircraft, for water for firefighting purposes.

An arrangement 1' according to a second example embodiment for actuating a closure element 110' that is movable for the purposes of selectively closing and opening up the outlet opening 121 of the tank 120 described above, which can be received or is accommodated in the aircraft 200, will be described below on the basis of FIGS. 13A, 13B. The arrangement 1' may be used in the above-described device 100 for dropping water W for firefighting purposes rather than in the above-described arrangement 1, in particular, for example, in the aircraft 200 in FIGS. 11, 12. The advantages described with regard to the first example embodiment can also be achieved with the second example embodiment. Additionally, with the second example embodiment, accommodating the device can be further simplified, wherein, in particular, the space requirement in a lower region of the outlet opening 121 and/or below the outlet opening, in particular in an approximately vertical direction with respect to a cargo compartment floor, can be reduced.

Figure 13B:
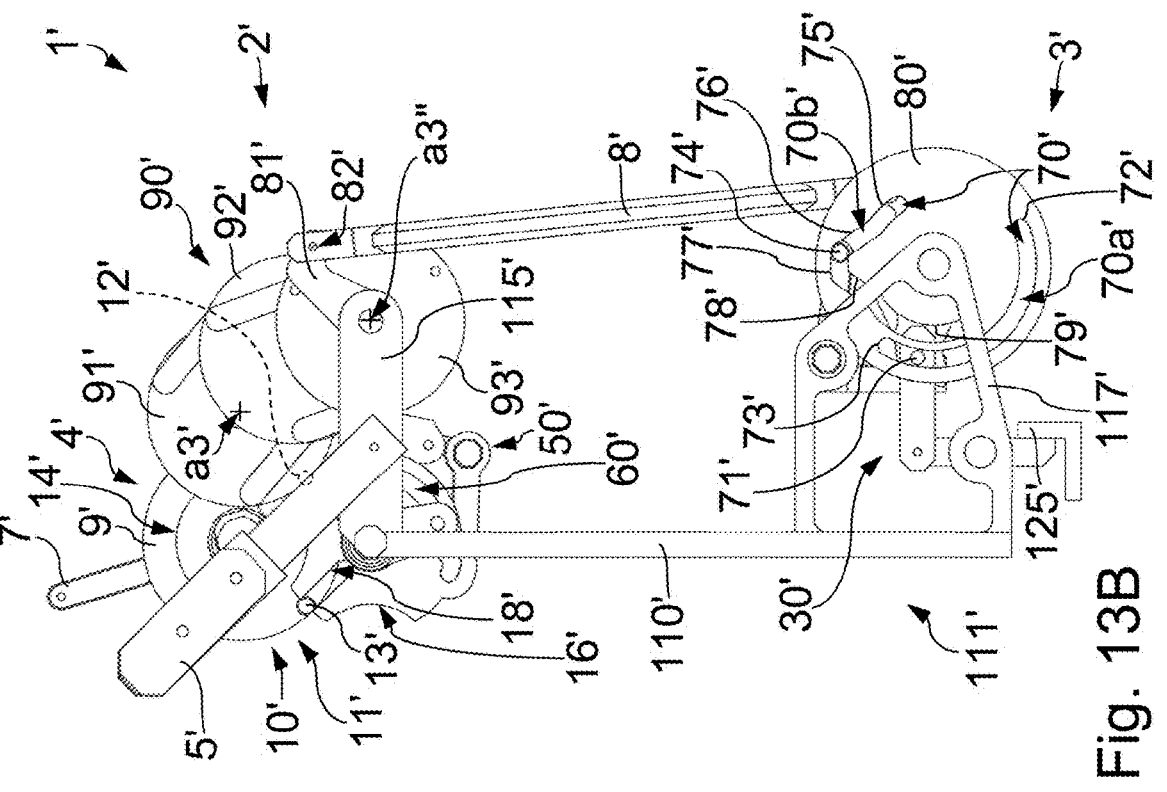
FIGS. 13A and 13B show an arrangement for actuating the closure element according to a second example embodiment in a side view from a first side and from a second side situated opposite the first side, with a pivotable, lever-like actuation element being situated in each case in a position in which the closure element is closed.
Figure 13A:
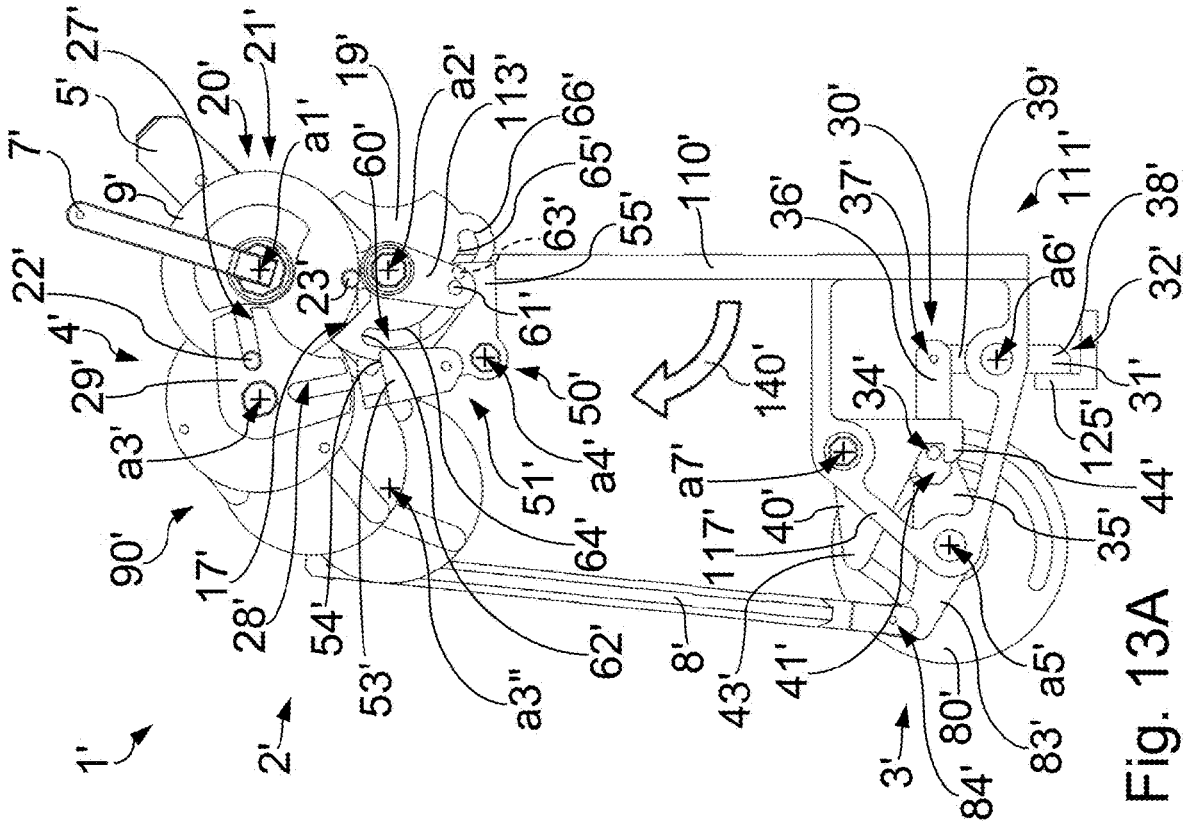

FIG. 13A shows that, in the second example embodiment, the outlet opening 121, which is not shown in the figure, can be sealingly closed, or opened up for the purposes of releasing water, by the flap-like closure element 110', which is pivotable in an opening direction 140', for example through an angle of approximately 90 degrees, in order to be opened. FIG. 13A-B show, merely using solid lines, a closed position 111' of the closure element 110'. Analogously to the first example embodiment, in the arrangement 1', the opening of the closure element 110' in the direction 140' is assisted by a preload device 5', which may be designed as in the first example embodiment.

The device 1' of the second example embodiment is a modification of the device 1 of the first example embodiment and comprises a first partial mechanism 2' and a second partial mechanism 3', wherein the second, lower partial mechanism 3' is not arranged as a whole so as to be static relative to the outlet opening 121, as in the device 1, but is instead movable conjointly with the closure element 110' as it pivots open.

Features and components which are shown in FIGS. 13A-B for the second example embodiment and which are provided analogously to the first example embodiment will be denoted below by the same reference designations followed by an apostrophe, and differences in relation to the first example embodiment will be described below.

In the arrangement 1', the closure element 110' is fixedly connected to an arm 115', which is coupled via a joint to the preload device 5'. The arm 115' is however of larger dimensions than in the device 1, in order to implement the conjoint pivotability of the second partial mechanism 3'.

Also, in the arrangement 1', a single actuation element 7' designed as a pivotable lever is provided, which enables the operating person to close the open closure element 110', lock the closure element in the closed position 111' and fasten the locking, unfasten the locking, and unlock the closure element 110' for the purposes of opening the closure element in order to release water. As in the first example embodiment, the closure element 110' opens upwards in relation to the direction of gravitational force, wherein, during the unlocking, the arrangement 1' is again brought into a state in which the closure element 110' can latch into its opened position and is hereby locked open. It is also the case in the second example embodiment that the locking in the opened position is released again during the closing of the closure element 110'.

FIG. 13A shows a front side of the arrangement 1', and FIG. 13B shows a rear side of the arrangement 1' in the same state thereof.

In the arrangement 1', the first partial mechanism 2' additionally has a coupling device 90', which is designed for example as a so-called Schmidt coupling. The coupling device 90' allows a pivoting state of one pivoting element to be rotationally conjointly transmitted to a second pivoting element, and at the same time allows a considerable displacement of the axes of the pivoting elements with respect to one another. The mode of operation of the arrangement 1' will be described in more detail below. The two partial mechanisms 2', 3' are coupled via the coupling device 90' and a transmission element 8', which is for example of rod-like form.

A first Geneva drive 10' of a Geneva drive mechanism 4' is, as in the arrangement 1, formed with pins 12', 13' and a blocking mechanism active surface 14' on a drive element 9', which is pivotable about a pivot axis a1' and which is connected rotationally conjointly to the actuation element 7'. By contrast, a Geneva drive 20' of the mechanism 4' is modified in relation to the first example embodiment, wherein the angular spacing between the pins 22', 23' on the drive element 9' has been reduced, and the blocking mechanism active surface 24 has now been omitted.

The pins 12', 13' of the drive geometry 11' serve for incrementally driving a first output element 19', which is supported so as to be rotatable about a second pivot axis a2', by virtue of the pins 12', 13' engaging into the slots 17' and 18', respectively, of the first output element. A second blocking mechanism active surface 16' can interact with the first blocking mechanism active surface 14', as in the arrangement 1.

The pins 22', 23' of the drive geometry 21', which are offset with respect to one another about the axis a1', for example by an angle of substantially 90 degrees, serve for incrementally driving a second output element 29', which is supported so as to be rotatable about a third pivot axis a3', by virtue of the pins 22', 23' engaging into the slots 27' and 28', respectively, of the second output element.

The drive geometries 11', 21' are thus movable conjointly by the actuation element 7'. In particular, in the arrangement 1' shown by way of example, the angle range within which the actuation element 7' is pivotable may be somewhat reduced in relation to the example embodiment of arrangement 1.

The output element 19' is, analogously to the output element 19, formed with a first control geometry 60' that has regions 64', 65', 66', but is arranged so as to be rotationally offset about the axis a2' in relation to the first example embodiment.

An arm 113' which is connected rotationally conjointly to the closure element 110' and which supports an engagement element 61' for engaging into the geometry 60' is also arranged in a modified position about the axis a2', analogously to the rotational offset of the output element 19', in relation to the arrangement 1.

As in the arrangement 1, a latching assembly 50' is provided, which is supported so as to be pivotable about a fourth pivot axis a4'. Correspondingly to the modification of the position of the output element 19', the orientation of the latching assembly 50' has also been modified, but its design having a latch 53', an edge 54' and an arm 55', and its function, are the same as described above for the assembly 50. In particular, the latching assembly 50' can, as described in more detail above, assume a latching-ready position and a release position 51'. FIGS. 13A-B show only the release position 51'. Furthermore, the pin-like engagement element 63' of the latching assembly 50' is indicated in FIG. 13A.

As in the first example embodiment, the positions of the axes a1', a2', a3' are fixed in relation to the outlet opening 121. The arm 115' is pivotable together with the closure element 110' about the axis a2'. In the arrangement 1', the second output element 29', which is pivotable about the axis a3', is coupled via the coupling device 90' to an arm 81', which is supported on the arm 115' pivotably about a further pivot axis a3", such that the position of the output element

29' can be transmitted rotationally conjointly and conformally to the arm 81' irrespective of the pivoting position of the arm 115'. This conformal transmission, with a large possible displacement of the axis a3", is made possible by the coupling device 90', which is designed for example as a Schmidt coupling.

In one variant, instead of the coupling device 90' designed as a Schmidt coupling, provision could be made for the axes a2', a3' and a3" to geometrically coincide, with the functions of the axes remaining decoupled. In the example of FIGS. 13A, 13B, the Schmidt coupling 90' allows flexibility in terms of the arrangement and the spacing of the axes a2', a3', a3".

In particular, in the example of FIGS. 13A, 13B, the second output element 29' is coupled rotationally conjointly to a first coupling disc 91', which is pivotable about the axis a3', and the arm 81' is coupled rotationally conjointly to a third coupling disc 93', which is pivotable about the axis a3" and supported on the arm 115'. The discs 91', 93' are each coupled via three parallel couplers to a second, middle coupling disc 92', the pivot axis of which is not fixed. At an articulated connection 82', the arm 81' is connected to the transmission element 8'.

The second partial mechanism 3' comprises a control element 80' supported so as to be rotatable about a fifth pivot axis a5', a locking partial mechanism 30' having a locking element 31' supported so as to be pivotable about a sixth pivot axis a6', and a fastening hook 40' supported so as to be pivotable about a seventh pivot axis a7', in an arrangement which has been modified in relation to that in the first example embodiment. Here, although the axes a5', a6' and a7' are furthermore fixed relative to one another, they are not fixed relative to the outlet opening 121. Instead, the control element 80', the locking element 31' and the fastening hook 40' are supported on a rigid frame 117' that is fixedly connected to the closure element 110'. The positions of the axes a5', a6' and a7' are fixed in relation to the frame 117'.

The control element 80' is coupled to the transmission element 8' via an arm 83', which is connected rotationally conjointly to the control element 80', and via an articulated connection 84'.

By the locking element 31', the closure element 110' can be locked in the closed position 111' shown in FIGS. 13A-B. For this purpose, the locking element 31', in its locking position 32', engages behind a retaining portion 125' which is formed for example with an edge and/or surface behind which the locking element 31' can engage. In FIGS. 13A-B, the partial mechanism 3' is arranged on the outside of the closure element 110' with respect to the outlet opening 121, and the water pressure when the tank is full acts on the closure element 110' from the right in FIG. 13A.

An arm 35' that is freely rotatable about the axis a5' is connected to the locking element 31' via an intermediate member 36' by articulated connections 34' and 37', analogously to the first example embodiment. At or on the articulation axis of the articulated connection 34', the locking partial mechanism 30' has an engagement element 71' by which, during the movement from the locking position into the unlocking position or vice versa, the partial mechanism 30' can be pushed in each case through a dead center, analogously to the first example embodiment.

An engagement element 74' on the fastening hook 40' allows the engagement element to pivot about the axis a7' between a fastening position 41' and an unfastening position that is not illustrated in FIGS. 13A-B.

A second control geometry 70' having a first part 70a' for the engagement of the engagement element 71' and having a second part 70*b*' for the engagement of the engagement element 74' is formed in the control element 80'. The parts 70*a*' and 70*b*' have been modified in relation to the first example embodiment such that each of the parts 70*a*', 70*b*' has been lengthened to include an arcuate additional region. The additional region serves to accommodate the additional rotation of the control element 80' that is caused, when the closure element 110' is in the opened position, by the pivoting of the partial mechanism 3' conjointly with the closure element 110' during its movement through for example approximately 90 degrees between the open and the closed position, without pushing the partial mechanism 30' beyond the dead center. The additional rotation arises from the fact that the arm 115' pivots, and at the same time the position of the coupling disc 93' is conformally maintained. During the additional rotation, the engagement elements 71' and 74' can pass through the additional region of each of the parts 70*a*' and 70*b*', without load being exerted on the engagement elements 71', 74'.

In the second example embodiment, the first part 70*a*' follows a path in the form of a segment of an arc with a constant radius, which also includes the additional region, and the second part 70*b*' is again formed with a bent shape, with the main bend in the shape pointing towards the outer edge of the control element 80'. The second part 70*b*' comprises first to fifth regions 75', 76', 77', 78', 79', wherein the arcuate fifth region 79' has been lengthened to include the aforementioned arcuate additional region. Reference is furthermore made to the first example embodiment.

The functioning of the arrangement 1' corresponds to that described with regard to the first example embodiment, with the differences discussed below.

By way of example, in FIGS. 13A-B, the tank is full. The closure element 110' is closed and locked, and the locking element 31' is fastened by the fastening hook 40'. As a result of further pivoting of the actuation element 7' anticlockwise in FIG. 13A, the engagement element 74' is moved to a smaller radius with respect to the axis a5', the fastening hook 40' is pivoted and unfastens the locking element 31', and the partial mechanism 30' is pushed beyond the dead center position as a result of the engagement element 71' bearing against the portion 73', which is moving downwards in FIGS. 13A-B. The closure element 110' is thus unlocked, and the outlet opening 121 is rapidly opened up in the manner described above, wherein the closure element 110' opens under the action of the water pressure in the tank 120 and with assistance from the preload device 5'.

After the water has been released, the closure element 110' locked in the opened position is unlocked, closed, and locked in the closed position 111', by virtue of the actuation element 7' being pivoted clockwise in FIG. 13A. The reduced angle between the positions of the two pins 22', 23' is conducive to a chronological overlap of the operations of the closing of the closure element 110' and of the locking of the locking element 31'. This results in a reduced pivotability angle range of the actuation element 7'. The locking element 31' is fastened by the fastening hook 40' as a result of the subsequent pivoting of the actuation element 7', anticlockwise in the view in FIG. 13A, back into the initial position illustrated in FIG. 13A.

The arrangement 1', too, can be used in a device for dropping water which is introduced in the manner of an equipment set and/or as a fully functional assembly into the cargo compartment of the aircraft 200, or which is alternatively fixedly installed in the aircraft 200. The arrangement 1' advantageously also implements the above-described actuating operations purely mechanically and using a single actuation element 7', wherein, in particular, the partial mechanism 3' can furthermore be accommodated even more easily because no or only little structural space is required in the lower region or below the outlet opening 121.

Although the disclosure herein has been described in full above on the basis of preferred example embodiments, the disclosure herein is not limited to these and may be modified in a variety of ways.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

1, 1' Arrangement
2, 2' First partial mechanism
3, 3' Second partial mechanism
4, 4' Geneva drive mechanism
5, 5' Preload device
6 Spring element
7, 7' Actuation element
8, 8' Transmission element
9, 9' Drive element (Geneva drive mechanism)
10, 10' First Geneva drive
11, 11' Drive geometry (first Geneva drive)
12, 12' First pin
13, 13' Second pin
14, 14' First blocking mechanism active surface
15 Rounded recess
16, 16' Second blocking mechanism active surface
17, 17' First slot
18, 18' Second slot
19, 19' First output element
20, 20' Second Geneva drive
21, 21' Drive geometry (second Geneva drive)
22, 22' Third pin
23, 23' Fourth pin
24 Third blocking mechanism active surface
25 Rounded outer contour
26 Fourth blocking mechanism active surface
27, 27' Third slot
28, 28' Fourth slot
29, 29' Second output element
30, 30' Locking partial mechanism
31, 31' Locking element
32, 32' Locking position (locking element)
33 Unlocking position (locking element)
34, 34' Articulated connection
35, 35' Arm
36, 36' Intermediate member
37, 37' Articulated connection
38, 38' First end region
39, 39' Second end region
40, 40' Fastening hook

41, 41' Fastening position
42 Unfastening position
43, 43' End region
44, 44' Hook structure
50, 50' Latching assembly
51, 51' Release position (latching assembly)
52 Latching-ready position (latching assembly)
53, 53' Latch
54, 54' Edge
55, 55' Arm
60, 60' First control geometry
61, 61' Engagement element
62, 62' Portion
63, 63' Engagement element
64, 64' First region
65, 65' Second region
66, 66' Third region
70, 70' Second control geometry
70a, 70a' First part (second control geometry)
70b, 70b' Second part (second control geometry)
71, 71' Engagement element
72, 72' Portion
73, 73' Portion
74, 74' Engagement element
75, 75' First region
76, 76' Second region
77, 77' Third region
78, 78' Fourth region
79, 79' Fifth region
80, 80' Control element
81, 81' Arm
82, 82' Articulated connection
83, 83' Arm
84, 84' Articulated connection
90' Coupling device
91' First coupling disc
92' Second coupling disc
93' Third coupling disc
100 Device for dropping water
110, 110' Closure element
111, 111' Closed position (closure element)
112 Opened position (closure element)
113, 113' Arm
115, 115' Arm
117' Frame
120 Tank
121 Outlet opening
125' Retaining portion
130 Outlet line
140, 140' Opening direction
200 Aircraft
201 Fuselage
202 Wing
203 Empennage
204 Nose
205 Tail
206 Tail ramp
207 Free end (tail ramp)
W Water
a1, a1' First pivot axis
a2, a2' Second pivot axis
a3, a3' Third pivot axis
a3" Further pivot axis
a4, a4' Fourth pivot axis
a5, a5' Fifth pivot axis
a6, a6' Sixth pivot axis
a7, a7' Seventh pivot axis s0 0-degree position (actuation element)
s45 45-degree position (actuation element)
s135 135-degree position (actuation element)
s195 195-degree position (actuation element)

The invention claimed is:

1. An arrangement for actuating a closure element that is movable to selectively close and open an outlet opening of a tank receivable in an aircraft of a device for dropping water for firefighting, the arrangement comprising:
a first Geneva drive and a second Geneva drive;
a common manually operable actuator in a form of a pivotable lever wherein movement of the lever sequentially and mechanically effects:
movement of the closure element to be locked from an opened position into a closed position by operation of the first Geneva drive;
locking of the closure element in the closed position by operation of the second Geneva drive; and
unlocking of the closure element locked in the closed position to permit release of water;
wherein drive geometries of the first and second Geneva drives are mechanically coupled so as to be moved conjointly by the lever; and
the arrangement operates without an electric, pneumatic, or hydraulic actuator.

2. The arrangement according to claim 1, wherein the arrangement makes it possible for the closure element to be locked in the opened position thereof and also for the closure element locked in the opened position to be released for closing the closure element.

3. The arrangement according to claim 1, comprising a movable locking partial mechanism for locking the closure element in the closed position, and wherein the arrangement makes it possible for the locking partial mechanism to be fastened when the closure element is closed and locked and for the fastened locking partial mechanism to be unfastened.

4. The arrangement according to claim 1, wherein the closing of the closure element, the locking of the closure element in the closed position and the unlocking of the closure element locked in the closed position can be effected by movement of one common actuation element, wherein the actuation element is the lever that can be pivoted by an operator.

5. The arrangement according to claim 4, wherein the arrangement makes it possible for the closure element to be locked in the opened position thereof and also for the closure element locked in the opened position to be released for closing the closure element, and wherein the closure element locked in the opened position can be released, for closing the closure element, by movement of the common actuation element.

6. The arrangement according to claim 4, comprising a movable locking partial mechanism for locking the closure element in the closed position, and wherein the arrangement makes it possible for the locking partial mechanism to be fastened when the closure element is closed and locked and for the fastened locking partial mechanism to be unfastened, and wherein the fastening and unfastening of the locking partial mechanism can be effected by movement of the common actuation element.

7. The arrangement according to claim 1, wherein, by operation of the first Geneva drive, the closing of the closure element can be effected by the closure element being moved from its opened position into its closed position, and/or wherein, by operation of the first Geneva drive, a movable latching assembly can be moved into a latching-ready position, in which the closure element can be locked in the opened position by latching by the latching assembly, and into a release position, in which the locking of the closure element in the opened position is released and the latching of the closure element is not possible.

8. The arrangement according to claim 7, wherein a first control geometry can be moved in rotation by the first Geneva drive at an output side, wherein the closure element can be moved into the closed position by an engagement element that is coupled to the closure element bearing against a portion of the first control geometry during a rotational movement thereof and the engagement element being driven along a substantially arcuate path, and/or the latching assembly can be moved between the latching-ready position and the release position by an engagement element that is coupled to the latching assembly being guided, as a result of a rotation of the first control geometry, along a path with a variable spacing to an axis of the rotation.

9. The arrangement according to claim 7, wherein:
by operation of the second Geneva drive, a locking element can be moved, by which the closure element can be locked in the closed position; and/or
by operation of the second Geneva drive, a fastening hook can be moved, by which the locking element can be temporarily fastened to be prevented from moving out of a locking position.

10. The arrangement according to claim 9, comprising:
a movable locking partial mechanism for locking the closure element in the closed position;
wherein the arrangement makes it possible for the locking partial mechanism to be fastened when the closure element is closed and locked and for the fastened locking partial mechanism to be unfastened;
wherein the locking element is part of the locking partial mechanism;
wherein the locking partial mechanism passes through a dead center during movement of the locking element from the locking position of the locking element into an unlocking position of the locking element; and
wherein the locking partial mechanism passes through a dead center during movement of the locking element from the unlocking position of the locking element into the locking position of the locking element.

11. The arrangement according to claim 9, wherein a second control geometry can be moved by the second Geneva drive at an output side, wherein the locking element can be moved into a locking position by an engagement element, which is movable in a manner coupled to a movement of the locking element, bearing against a first portion of the second control geometry during a rotational movement thereof and the engagement element being driven along a substantially arcuate path in a first direction, and can be moved into an unlocking position by the engagement element bearing against a second portion of the second control geometry during a rotational movement thereof and the engagement element being driven along the path in a second direction, and/or the fastening hook can be moved between a fastening position and an unfastening position by an engagement element that is coupled to the fastening hook being guided, as a result of a rotation of the second control geometry, along a path with a variable spacing to an axis of the rotation.

12. The arrangement according to claim 1, wherein the arrangement has a preload device, by which the closure element, as the closure element is closed for closing the outlet opening, can be preloaded in an opening direction.

13. The arrangement according to claim 12, wherein the preload device has a spring element.

14. A device for dropping water from an aircraft for firefighting, comprising a tank that has an outlet opening, having a closure element for selectively closing and opening up the outlet opening, and comprising the arrangement according to claim 1.

15. An aircraft comprising the device according to claim 14.

16. An arrangement for actuating a closure element that is movable to selectively close and open up an outlet opening of a tank, which can be received or is accommodated in an aircraft, of a device for dropping water for firefighting, wherein:
the arrangement is formed with a Geneva drive mechanism;
the arrangement at least makes it possible for:
the closure element, when situated in an opened position, to be closed to close the outlet opening in a closed position;
the closure element to be locked in the closed position; and
the closure element locked in the closed position to be unlocked for opening the closure element, when the tank is full, in order to release water;
wherein the Geneva drive mechanism comprises a first Geneva drive and a second Geneva drive; and
wherein:
by operation of the second Geneva drive, a locking element can be moved, by which the closure element can be locked in the closed position; and/or
by operation of the second Geneva drive, a fastening hook can be moved, by which the locking element can be temporarily fastened to be prevented from moving out of a locking position.

17. The arrangement according to claim 16, comprising:
a movable locking partial mechanism for locking the closure element in the closed position;
wherein the arrangement makes it possible for the locking partial mechanism to be fastened when the closure element is closed and locked and for the fastened locking partial mechanism to be unfastened;
wherein the locking element is part of the locking partial mechanism;
wherein the locking partial mechanism passes through a dead center during movement of the locking element from the locking position of the locking element into an unlocking position of the locking element; and
wherein the locking partial mechanism passes through a dead center during movement of the locking element from the unlocking position of the locking element into the locking position of the locking element.

18. The arrangement according to claim 16, wherein a second control geometry can be moved by the second Geneva drive at an output side, wherein the locking element can be moved into a locking position by an engagement element, which is movable in a manner coupled to a movement of the locking element, bearing against a first portion of the second control geometry during a rotational movement thereof and the engagement element being driven along a substantially arcuate path in a first direction, and can be moved into an unlocking position by the engagement element bearing against a second portion of the second control geometry during a rotational movement thereof and the engagement element being driven along the path in a second direction, and/or the fastening hook can be moved between a fastening position and an unfastening position by an engagement element that is coupled to the fastening hook being guided, as a result of a rotation of the second control geometry, along a path with a variable spacing to an axis of the rotation.

19. An arrangement for actuating a closure element that is movable to selectively close and open up an outlet opening of a tank, which can be received or is accommodated in an aircraft, of a device for dropping water for firefighting, wherein:

the arrangement is formed with a Geneva drive mechanism;

the arrangement at least makes it possible for:

the closure element, when situated in an opened position, to be closed to close the outlet opening in a closed position;

the closure element to be locked in the closed position; and the closure element locked in the closed position to be unlocked for opening the closure element, when the tank is full, in order to release water;

wherein the arrangement has a preload device, by which the closure element, as the closure element is closed for closing the outlet opening, can be preloaded in an opening direction.

20. The arrangement according to claim 19, wherein the preload device has a spring element.

\* \* \* \* \*